US009020825B1

(12) United States Patent
Garber

(10) Patent No.: US 9,020,825 B1
(45) Date of Patent: Apr. 28, 2015

(54) VOICE GESTURES

(71) Applicant: Brian A. Garber, Seattle, WA (US)

(72) Inventor: Brian A. Garber, Seattle, WA (US)

(73) Assignee: Rawles LLC, Wilmington, DE (US)

( * ) Notice: Subject to any disclaimer, the term of this patent is extended or adjusted under 35 U.S.C. 154(b) by 182 days.

(21) Appl. No.: 13/626,676

(22) Filed: Sep. 25, 2012

(51) Int. Cl.
*G10L 21/00* (2013.01)
*G10L 25/00* (2013.01)
*G10L 15/26* (2006.01)

(52) U.S. Cl.
CPC .................................. *G10L 15/265* (2013.01)

(58) Field of Classification Search
USPC .................... 704/231–257, 270–275
See application file for complete search history.

(56) References Cited

U.S. PATENT DOCUMENTS

| 6,219,645 | B1 * | 4/2001 | Byers ............................ 704/275 |
| 6,289,140 | B1 * | 9/2001 | Oliver ........................... 382/313 |
| 6,370,504 | B1 * | 4/2002 | Zick et al. ..................... 704/251 |
| 7,505,908 | B2 * | 3/2009 | Johnston et al. .............. 704/275 |
| 7,518,631 | B2 * | 4/2009 | Hershey et al. .............. 348/14.1 |
| 2002/0116197 | A1 * | 8/2002 | Erten ............................ 704/273 |
| 2005/0043067 | A1 * | 2/2005 | Odell et al. ................. 455/569.2 |
| 2009/0132926 | A1 * | 5/2009 | Bucha ........................... 715/730 |
| 2010/0280829 | A1 * | 11/2010 | Gopi et al. .................... 704/275 |
| 2012/0223885 | A1 | 9/2012 | Perez |

FOREIGN PATENT DOCUMENTS

WO    WO2011088053    7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

* cited by examiner

*Primary Examiner* — Jesse Pullias
(74) *Attorney, Agent, or Firm* — Lee & Hayes, PLLC

(57) ABSTRACT

A voice gesture is determined from characteristics of an audio signal based on sound uttered by a user. The voice gesture may represent a command or parameters or a command, and may be context sensitive. Upon determining a command and parameters of the command based on the received voice gesture, the command is executed in accordance with the determined parameters. The command may modify any number of attributes within an environment including, but limited to, an image projected within the environment.

20 Claims, 17 Drawing Sheets

VOICE GESTURES

BACKGROUND

Augmented reality allows interaction among users, real-world objects, and virtual or computer-generated objects and information within an environment. The environment may be, for example, a room equipped with computerized projection and imaging systems that enable presentation of images on various objects within the room and facilitate user interaction with the images and/or objects. The augmented reality may range in sophistication from partial augmentation, such as projecting a single image onto a surface and monitoring user interaction with the image, to full augmentation where an entire room is transformed into another reality for the user's senses. The user can interact with the environment in many ways, including through motion, physical gestures, voice, and so forth.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Augmented reality environments allow users to interact with physical and virtual objects in a physical space. Augmented reality environments are formed through systems of resources such as cameras, microphones, projectors, computing devices with processing and memory capabilities, and so forth. The projectors project images onto the surroundings that define the environment and the microphones and cameras monitor and capture user interactions with such images.

An augmented reality environment is commonly hosted or otherwise set within a surrounding area, such as a room, building, or other type of space. In some cases, the augmented reality environment may involve the entire surrounding area. In other cases, an augmented reality environment may involve a localized area of a room, such as a reading area or entertainment area.

Described herein are techniques for recognizing and responding to voice gestures. Illustrative implementations are described below in which voice gestures may be used to submit commands including, but not limited to, zoom, pan, scroll, web browser navigation, and so on. The various implementations of the techniques described herein are merely representative.

Illustrative Environment

Figure 1:
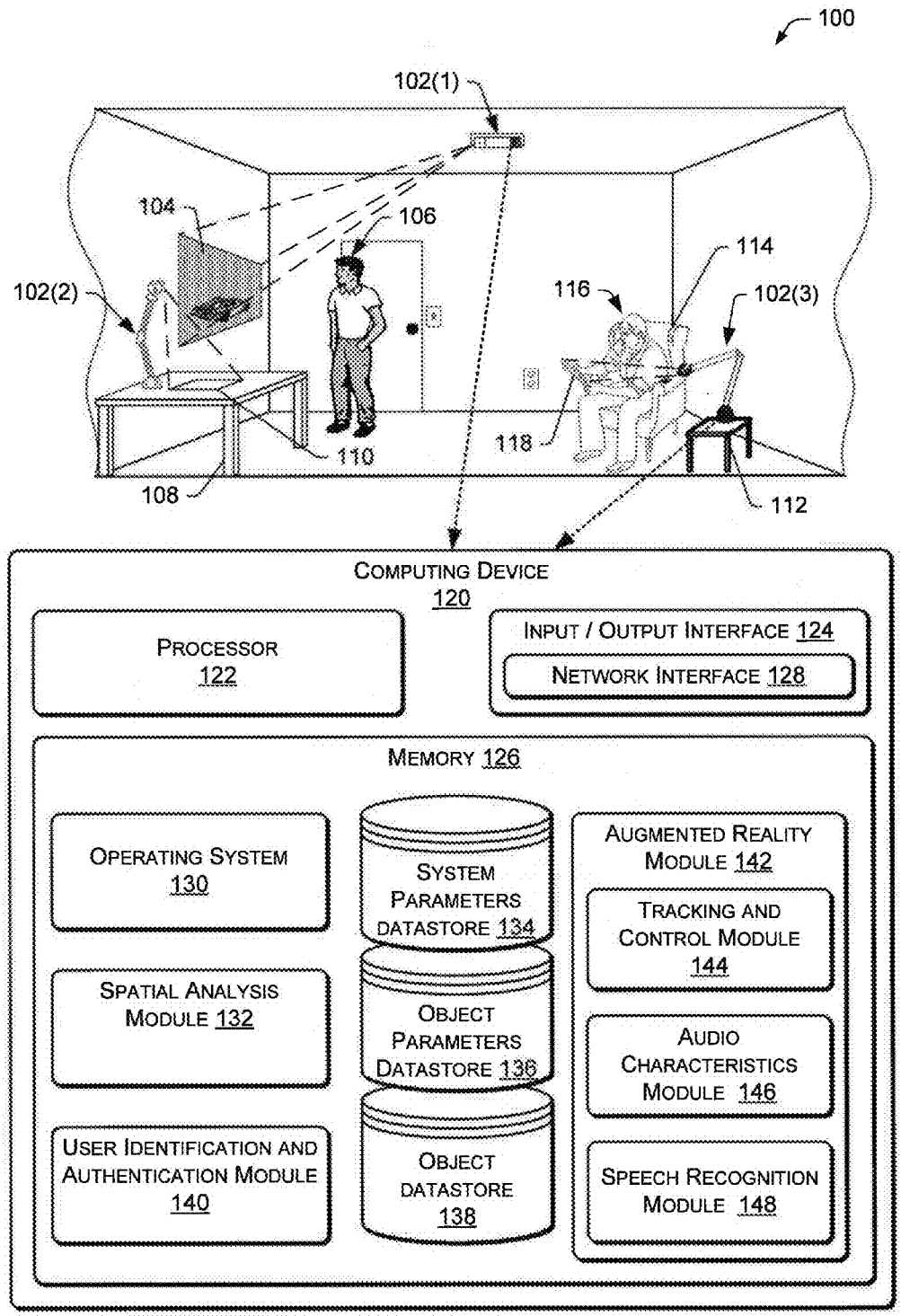
FIG. 1 shows an illustrative scene with an augmented reality environment hosted in an environmental area, such as a room. The augmented reality environment is provided, in part, by three projection and image capture systems.

FIG. 1 shows an illustrative augmented reality environment 100 created within a scene, and hosted within an environmental area, which in this case is a room. Three augmented reality functional nodes (ARFN) 102(1)-(3) are shown within the room. Each ARFN contains projectors, cameras, and computing resources that are used to generate the augmented reality environment 100. In this illustration, the first ARFN 102(1) is a fixed mount system that may be mounted within the room, such as to the ceiling, although other placements are possible. The first ARFN 102(1) projects images onto the scene, such as onto a surface or screen 104 on a wall of the room. A first user 106 may watch and interact with the images being projected onto the wall, and the ceiling-mounted ARFN 102(1) may capture that interaction. One implementation of the first ARFN 102(1) is provided below in more detail with reference to FIG. 2.

A second ARFN 102(2) is embodied as a table lamp, which is shown sitting on a desk 108. The second ARFN 102(2) projects images 110 onto the surface of the desk 108 for the user 106 to consume and interact. The projected images 110 may be of any number of things, such as homework, video games, news, or recipes.

A third ARFN 102(3) is also embodied as a table lamp, shown sitting on a small table 112 next to a chair 114. A second user 116 is seated in the chair and is holding a portable projection screen 118. The third ARFN 102(3) projects images onto the surface of the portable screen 118 for the user 116 to consume and interact. The projected images may be of any number of things, such as books, games (e.g., crosswords, Sudoku, etc.), news, magazines, movies, browser, etc. The portable screen 118 may be essentially any device for use within an augmented reality environment, and may be provided in several form factors. It may range from an entirely passive, non-electronic, mechanical surface to a full functioning, full processing, electronic device with a projection surface.

These are just sample locations. In other implementations, one or more ARFNs may be placed around the room in any number of arrangements, such as on or in furniture, on the wall, beneath a table, and so forth.

Associated with each ARFN 102(1)-(3), or with a collection of ARFNs, is a computing device 120, which may be located within the augmented reality environment 100 or disposed at another location external to the augmented reality environment 100. Each ARFN 102 may be connected to the computing device 120 via a wired network, a wireless network, or a combination of the two. The computing device 120 has a processor 122, an input/output interface 124, and a memory 126. The processor 122 may include one or more processors configured to execute instructions. The instructions may be stored in memory 126, or in other memory accessible to the processor 122, such as storage in cloud-based resources.

The input/output interface 124 may be configured to couple the computing device 120 to other components, such as projectors, cameras, microphones, other ARFNs, other computing devices, and so forth. The input/output interface 124 may further include a network interface 128 that facilitates connection to a remote computing system, such as cloud computing resources. The network interface 128 enables access to one or more network types, including wired and wireless networks. More generally, the coupling between the computing device 120 and any components may be via wired technologies (e.g., wires, fiber optic cable, etc.), wireless technologies (e.g., RF, cellular, satellite, Bluetooth, etc.), or other connection technologies.

The memory 126 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

Several modules such as instructions, datastores, and so forth may be stored within the memory 126 and configured to execute on a processor, such as the processor 122. An operating system module 130 is configured to manage hardware and services within and coupled to the computing device 120 for the benefit of other modules.

A spatial analysis module 132 is configured to perform several functions which may include analyzing a scene to generate a topology, recognizing objects in the scene, dimensioning the objects, and creating a 3D model of the scene. Characterization may be facilitated using several technologies including structured light, light detection and ranging (LIDAR), optical time-of-flight, ultrasonic ranging, stereoscopic imaging, radar, and so forth either alone or in combination with one another. For convenience, and not by way of limitation, some of the examples in this disclosure refer to structured light although other techniques may be used. The spatial analysis module 132 provides the information used within the augmented reality environment to provide an interface between the physicality of the scene and virtual objects and information.

A system parameters datastore 134 is configured to maintain information about the state of the computing device 120, the input/output devices of the ARFN, and so forth. For example, system parameters may include current pan and tilt settings of the cameras and projectors. As used in this disclosure, the datastore includes lists, arrays, databases, and other data structures used to provide storage and retrieval of data.

An object parameters datastore 136 in the memory 126 is configured to maintain information about the state of objects within the scene. The object parameters may include the surface contour of the object, overall reflectivity, color, and so forth. This information may be acquired from the ARFN, other input devices, or via manual input and stored within the object parameters datastore 136.

An object datastore 138 is configured to maintain a library of pre-loaded reference objects. This information may include assumptions about the object, dimensions, and so forth. For example, the object datastore 138 may include a reference object of a beverage can and include the assumptions that beverage cans are either held by a user or sit on a surface, and are not present on walls or ceilings. The spatial analysis module 132 may use this data maintained in the datastore 138 to test dimensional assumptions when determining the dimensions of objects within the scene. In some implementations, the object parameters in the object parameters datastore 136 may be incorporated into the object datastore 138. For example, objects in the scene which are temporally persistent, such as walls, a particular table, particular users, and so forth may be stored within the object datastore 138. The object datastore 138 may be stored on one or more of the memory of the ARFN, storage devices accessible on the local network, or cloud storage accessible via a wide area network.

A user identification and authentication module 140 is stored in memory 126 and executed on the processor(s) 122 to use one or more techniques to verify users within the environment 100. In one implementation, the ARFN 102 may capture an image of the user's face and the spatial analysis module 132 reconstructs 3D representations of the user's face. Rather than 3D representations, other biometric profiles may be computed, such as a face profile that includes key biometric parameters such as distance between eyes, location of nose relative to eyes, etc. In such profiles, less data is used than full reconstructed 3D images. The user identification and authentication module 140 can then match the reconstructed images (or other biometric parameters) against a database of images (or parameters), which may be stored locally or remotely on a storage system or in the cloud, for purposes of authenticating the user. If a match is detected, the user is permitted to interact with the system.

An augmented reality module 142 is configured to generate augmented reality output in concert with the physical environment. The augmented reality module 142 may employ essentially any surface, object, or device within the environment 100 to interact with the users. The augmented reality module 142 may be used to track items within the environment that were previously identified by the spatial analysis module 132. The augmented reality module 142 includes a tracking and control module 144 configured to track one or more items within the scene and accept inputs from or relating to the items.

The augmented reality module 142 also includes an audio characteristics module 146 and a speech recognition module 148. The audio characteristics module 146 is configured to determine any number of characteristics of detected audio (e.g., sounds uttered by a user). These characteristics may include, for example, any combination of volume, pitch, origin location, and directionality (i.e., the direction the sound travels from an origin when uttered by the user). In an example implementation, data from other modules of the ARFN 102 may be utilized, at least in part, to assist the audio characteristics module 146 in determining directionality of sound. For example, input from the spatial analysis module 132 and the tracking and control module 144 may provide information regarding physical locations of users within an environment.

The speech recognition module 148 is configured to perform speech recognition on received audio input to determine a recognizable voice command.

The ARFNs 102 and computing components of device 120 that have been described thus far may be operated to create an augmented reality environment in which images are projected onto various surfaces and items in the room, and the users 106 and 116 may interact with the images. The users' movements, voice commands, and other interactions are captured by the ARFNs 102 to facilitate user input to the environment.

Example ARFN Implementation

Figure 2:
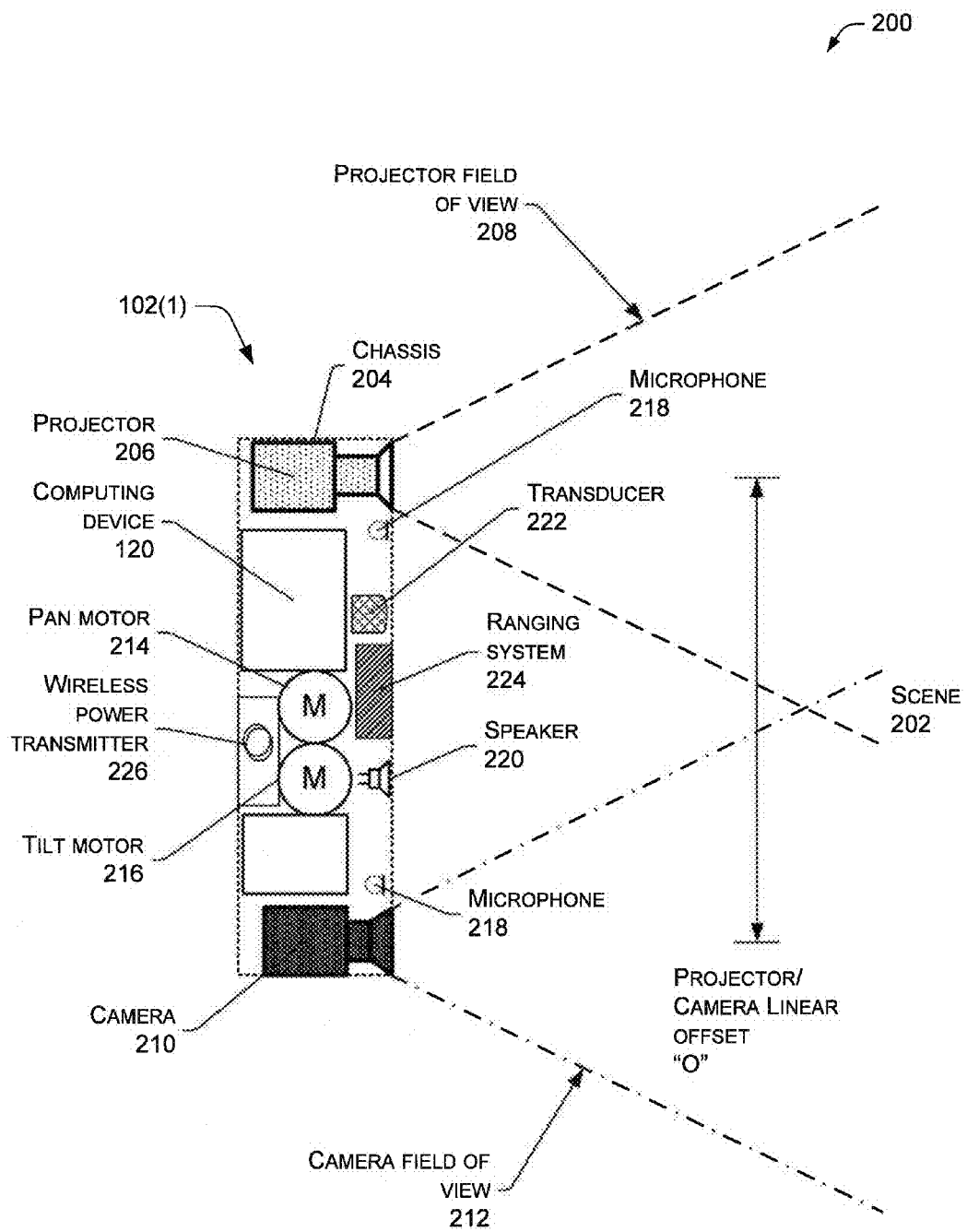
FIG. 2 shows an implementation of a projection and image capturing system formed as an augmented reality functional node having a chassis to hold a projector and camera in spaced relation to one another.

FIG. 2 shows an illustrative schematic 200 of the first augmented reality functional node 102(1) and selected components. The first ARFN 102(1) is configured to scan at least a portion of a scene 202 and the objects therein. The ARFN 102(1) may also be configured to provide augmented reality output, such as images, sounds, and so forth.

A chassis 204 holds the components of the ARFN 102(1). Within the chassis 204 may be disposed a projector 206 that generates and projects images into the scene 202. These images may be visible light images perceptible to the user, visible light images imperceptible to the user, images with non-visible light, or a combination thereof. This projector 206 may be implemented with any number of technologies capable of generating an image and projecting that image onto a surface within the environment. Suitable technologies include a digital micromirror device (DMD), liquid crystal on silicon display (LCOS), liquid crystal display, 3LCD, and so forth. The projector 206 has a projector field of view 208 which describes a particular solid angle. The projector field of view 208 may vary according to changes in the configuration of the projector. For example, the projector field of view 208 may narrow upon application of an optical zoom to the projector. In some implementations, a plurality of projectors 206 may be used. Further, in some implementations, the projector 206 may be further configured to project patterns, such as non-visible infrared patterns, that can be detected by camera(s) and used for 3D reconstruction and modeling of the environment. The projector 206 may comprise a microlaser projector, a digital light projector (DLP), cathode ray tube (CRT) projector, liquid crystal display (LCD) projector, light emitting diode (LED) projector or the like.

A camera 210 may also be disposed within the chassis 204. The camera 210 is configured to image the scene in visible light wavelengths, non-visible light wavelengths, or both. The camera 210 may be implemented in several ways. In some instances, the camera may be embodied as an RGB camera. In other instances, the camera may include time-of-flight (ToF) sensors. In still other instances, the camera 210 may be an RGBZ camera that includes both ToF and RGB sensors. The camera 210 has a camera field of view 212 which describes a particular solid angle. The camera field of view 212 may vary according to changes in the configuration of the camera 210. For example, an optical zoom of the camera may narrow the camera field of view 212. In some implementations, a plurality of cameras 210 may be used.

The chassis 204 may be mounted with a fixed orientation, or be coupled via an actuator to a fixture such that the chassis 204 may move. Actuators may include piezoelectric actuators, motors, linear actuators, and other devices configured to displace or move the chassis 204 or components therein such as the projector 206 and/or the camera 210. For example, in one implementation, the actuator may comprise a pan motor 214, tilt motor 216, and so forth. The pan motor 214 is configured to rotate the chassis 204 in a yawing motion. The tilt motor 216 is configured to change the pitch of the chassis 204. By panning and/or tilting the chassis 204, different views of the scene may be acquired. The spatial analysis module 114 may use the different views to monitor objects within the environment.

One or more microphones 218 may be disposed within the chassis 204, or elsewhere within the scene. These microphones 218 may be used to acquire input from the user, for echolocation, location determination of a sound, or to otherwise aid in the characterization of and receipt of input from the scene. For example, the user may make a particular noise, such as a tap on a wall or snap of the fingers, which are pre-designated to initiate an augmented reality function. The user may alternatively use voice commands or voice gestures. Such audio inputs may be located within the scene using time-of-arrival differences among the microphones and used to summon an active zone within the augmented reality environment. Further, the microphones 218 may be used to receive voice input from the user for purposes of identifying and authenticating the user. The voice input may be received and passed to the user identification and authentication module 122, the audio characteristics module 146, or the speech recognition module 148 in the computing device 104 for analysis and verification.

One or more speakers 220 may also be present to provide for audible output. For example, the speakers 220 may be used to provide output from a text-to-speech module, to playback pre-recorded audio, etc.

A transducer 222 may be present within the ARFN 102(1), or elsewhere within the environment, and configured to detect and/or generate inaudible signals, such as infrasound or ultrasound. The transducer may also employ visible or non-visible light to facilitate communication. These inaudible signals may be used to provide for signaling between accessory devices and the ARFN 102(1).

A ranging system 224 may also be provided in the ARFN 102 to provide distance information from the ARFN 102 to an object or set of objects. The ranging system 224 may comprise radar, light detection and ranging (LIDAR), ultrasonic ranging, stereoscopic ranging, and so forth. In some implementations, the transducer 222, the microphones 218, the speaker 220, or a combination thereof may be configured to use echolocation or echo-ranging to determine distance and spatial characteristics.

A wireless power transmitter 226 may also be present in the ARFN 102, or elsewhere within the augmented reality environment. The wireless power transmitter 226 is configured to transmit electromagnetic fields suitable for recovery by a wireless power receiver and conversion into electrical power for use by active components in other electronics, such as a non-passive screen 118. The wireless power transmitter 226 may also be configured to transmit visible or non-visible light to communicate power. The wireless power transmitter 226 may utilize inductive coupling, resonant coupling, capacitive coupling, and so forth.

In this illustration, the computing device 120 is shown within the chassis 204. However, in other implementations all or a portion of the computing device 120 may be disposed in another location and coupled to the ARFN 102(1). This coupling may occur via wire, fiber optic cable, wirelessly, or a combination thereof. Furthermore, additional resources external to the ARFN 102(1) may be accessed, such as resources in another ARFN accessible via a local area network, cloud resources accessible via a wide area network connection, or a combination thereof.

The ARFN 102(1) is characterized in part by the offset between the projector 206 and the camera 210, as designated by a projector/camera linear offset "O". This offset is the linear distance between the projector 206 and the camera 210. Placement of the projector 206 and the camera 210 at distance "O" from one another aids in the recovery of structured light data from the scene. The known projector/camera linear offset "O" may also be used to calculate distances, dimensioning, and otherwise aid in the characterization of objects within the scene 202. In other implementations, the relative angle and size of the projector field of view 208 and camera field of view 212 may vary. Also, the angle of the projector 206 and the camera 210 relative to the chassis 204 may vary.

Due to this offset "O", the projector 206 and camera 210 employ separate optical paths. That is, the projector 206 employs a set of lenses to project images along a first optical path therein, and the camera 210 employs a different set of lenses to image the scene by capturing the light scattered by the surroundings.

In other implementations, the components of the ARFN 102(1) may be distributed in one or more locations within the environment 100. As mentioned above, microphones 218 and speakers 220 may be distributed throughout the scene. The projector 206 and the camera 210 may also be located in separate chassis 204.

Figure 3:
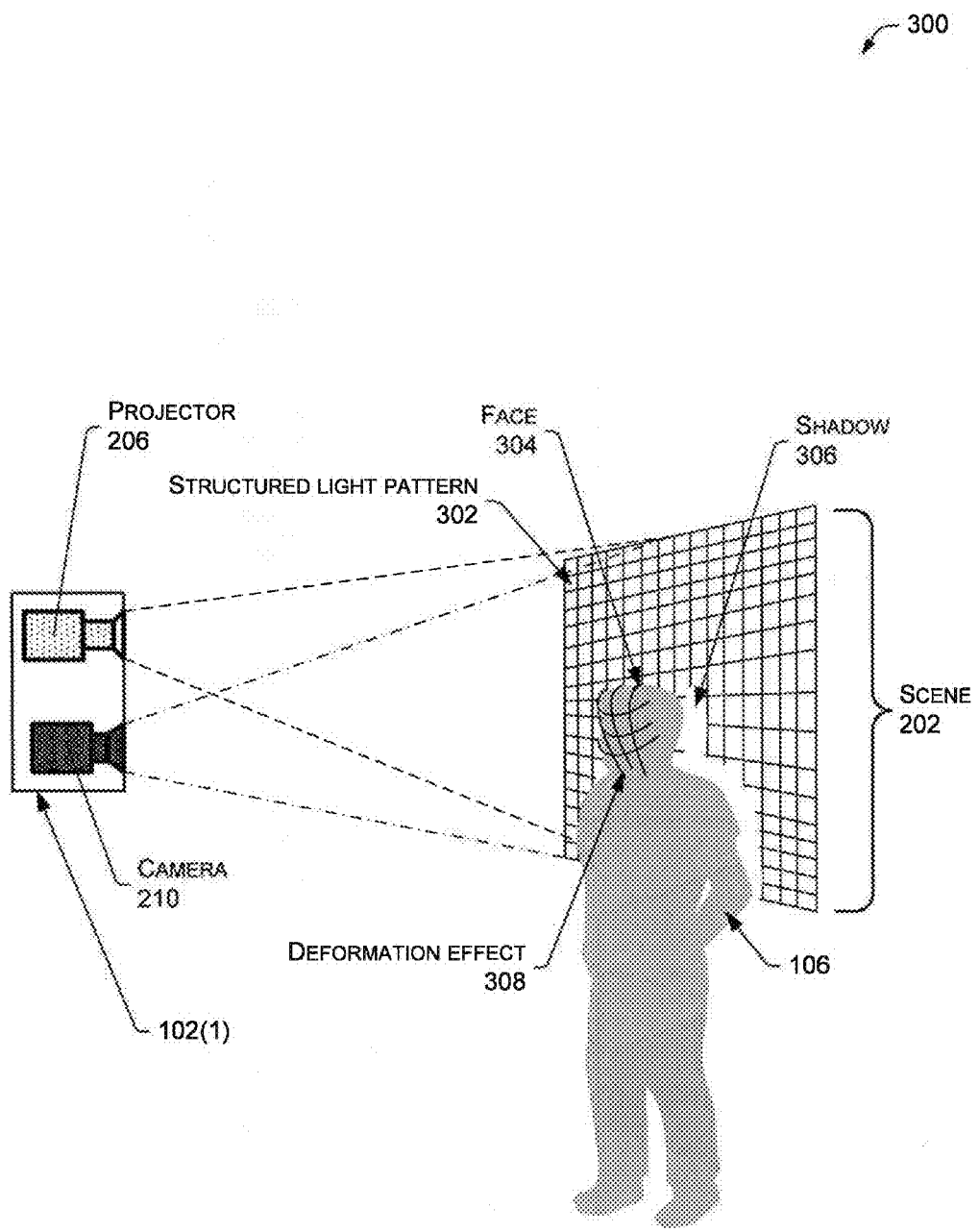
FIG. 3 illustrates one example implementation of creating an augmented reality environment by projecting a structured light pattern on a scene and capturing a corresponding image of the scene.

FIG. 3 illustrates one example operation 300 of the ARFN 102(1) of creating an augmented reality environment by projecting a structured light pattern on a scene and capturing a corresponding image of the scene. In this illustration, the projector 206 within the ARFN 102(1) projects a structured light pattern 302 onto the scene 202. In some implementations, a sequence of different structure light patterns 302 may be used. This structured light pattern 302 may be in wavelengths which are visible to the user, non-visible to the user, or a combination thereof. The structured light pattern 304 is shown as a grid in this example, but not by way of limitation. In other implementations, other patterns may be used, such as bars, dots, pseudorandom noise, and so forth. Pseudorandom noise (PN) patterns are particularly useful because a particular point within the PN pattern may be specifically identified. A PN function is deterministic in that given a specific set of variables, a particular output is defined. This deterministic behavior allows the specific identification and placement of a point or block of pixels within the PN pattern.

The user 106 is shown within the scene 202 such that the user's face 304 is between the projector 206 and a wall. A shadow 306 from the user's body appears on the wall. Further, a deformation effect 308 is produced on the shape of the user's face 304 as the structured light pattern 302 interacts with the facial features. This deformation effect 308 is detected by the camera 210, which is further configured to sense or detect the structured light. In some implementations, the camera 210 may also sense or detect wavelengths other than those used for structured light pattern 302.

The images captured by the camera 210 may be used for any number of things. For instances, some images of the scene are processed by the spatial analysis module 132 to characterize the scene 202 or to define coordinate systems within the scene. In some implementations, multiple cameras may be used to acquire the image. In other instances, the images of the user's face 304 (or other body contours, such as hand shape) may be processed by the spatial analysis module 132 to reconstruct 3D images of the user, which are then passed to the user identification and authentication module 140 for purposes of verifying the user or to determine a position of the user's eyes and the direction that the user is looking. In still other instances, images may be captured by the camera 210 to determine characteristics of a surface prior to projecting a source image onto the surface.

Certain features of objects within the scene 202 may not be readily determined based upon the geometry of the ARFN 102(1), shape of the objects, distance between the ARFN 102(1) and the objects, and so forth. As a result, the spatial analysis module 132 may be configured to make one or more assumptions about the scene, and test those assumptions to constrain the dimensions of the scene 202 and maintain the model of the scene.

Example Voice Gestures

Voice gestures may be based on any combination of sound characteristics, including volume, pitch, origin location, and directionality. Furthermore, voice gestures may be based on changes in the volume, pitch, origin location, and directionality, or may be based on specific origin locations, directions, volume levels, and pitch levels. Voice gestures may themselves represent commands or a voice gesture may represent an execution parameter to be applied to a particular command that may be determined in other ways (e.g., by speech recognition or by environmental context). When a voice gesture represents an execution parameter, the parameter may be context sensitive such that the same voice gesture may represent different execution parameters when applied to different commands. Actions performed in response to a received voice gesture may be pre-defined or may be user-configurable.

Figure 4:
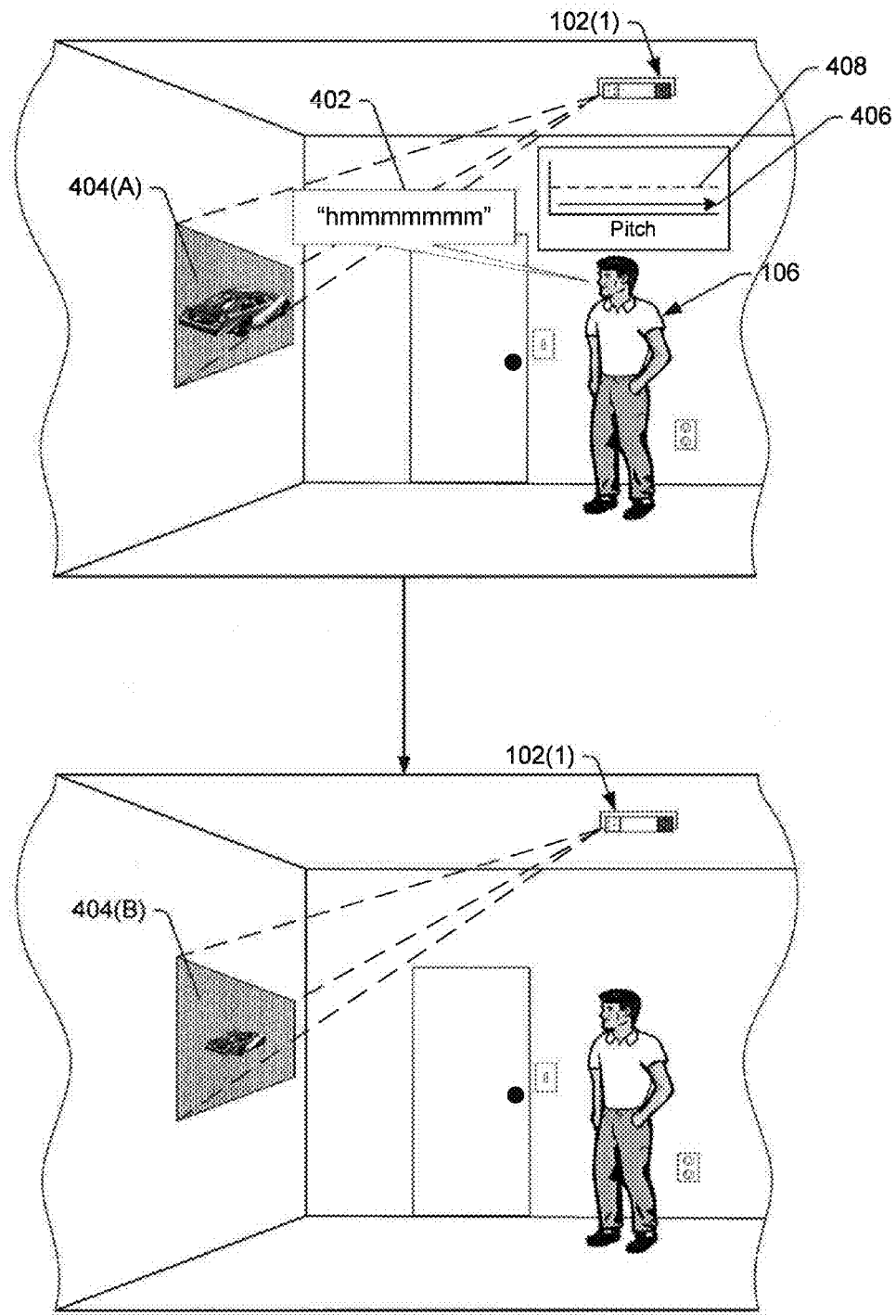
FIG. 4 illustrates a zoom voice gesture that is based on the pitch of a user's voice.
Figure 5:
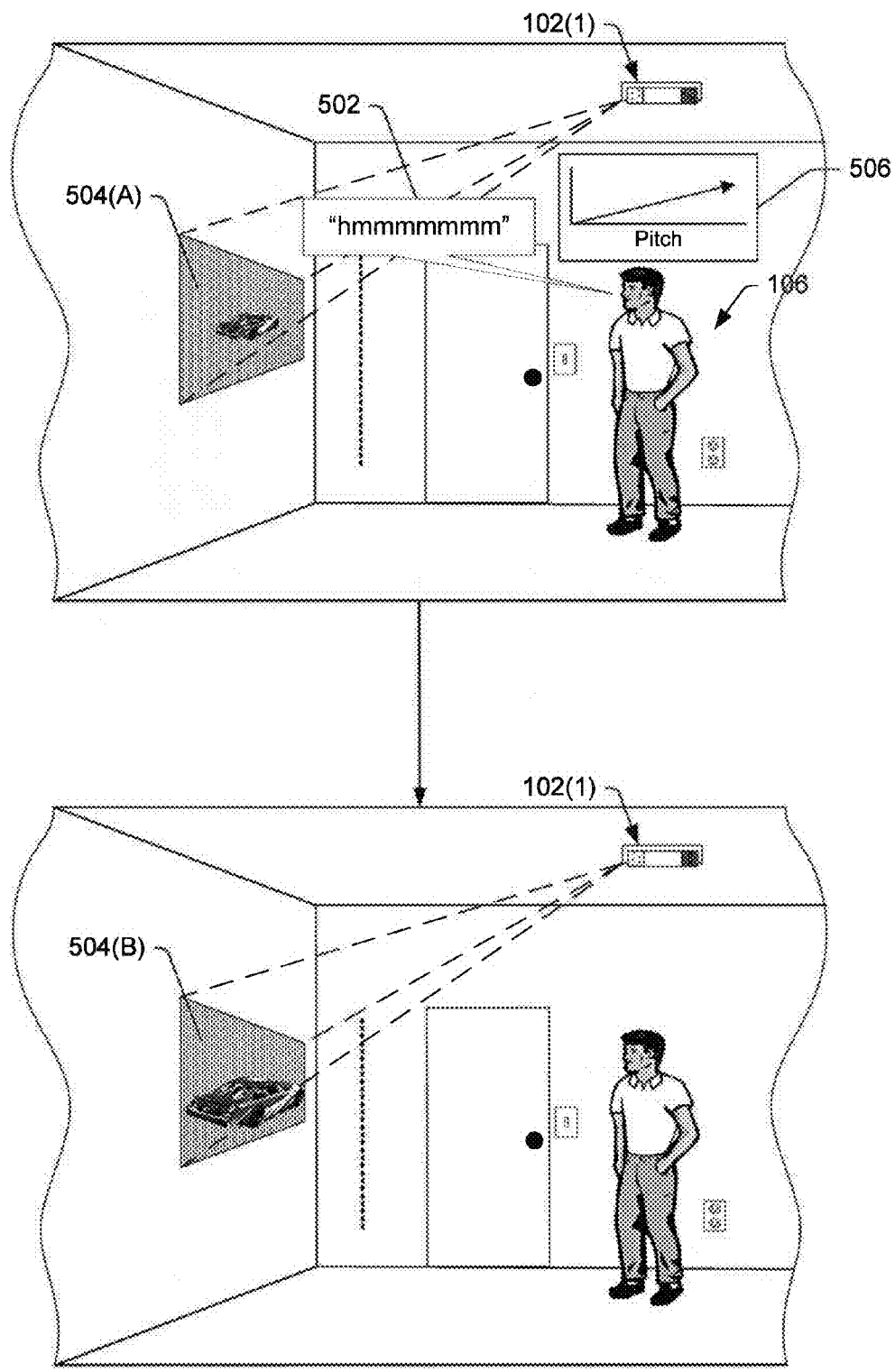
FIG. 5 illustrates a zoom-in voice gesture that is based on a change in pitch of a user's voice.
Figure 6:
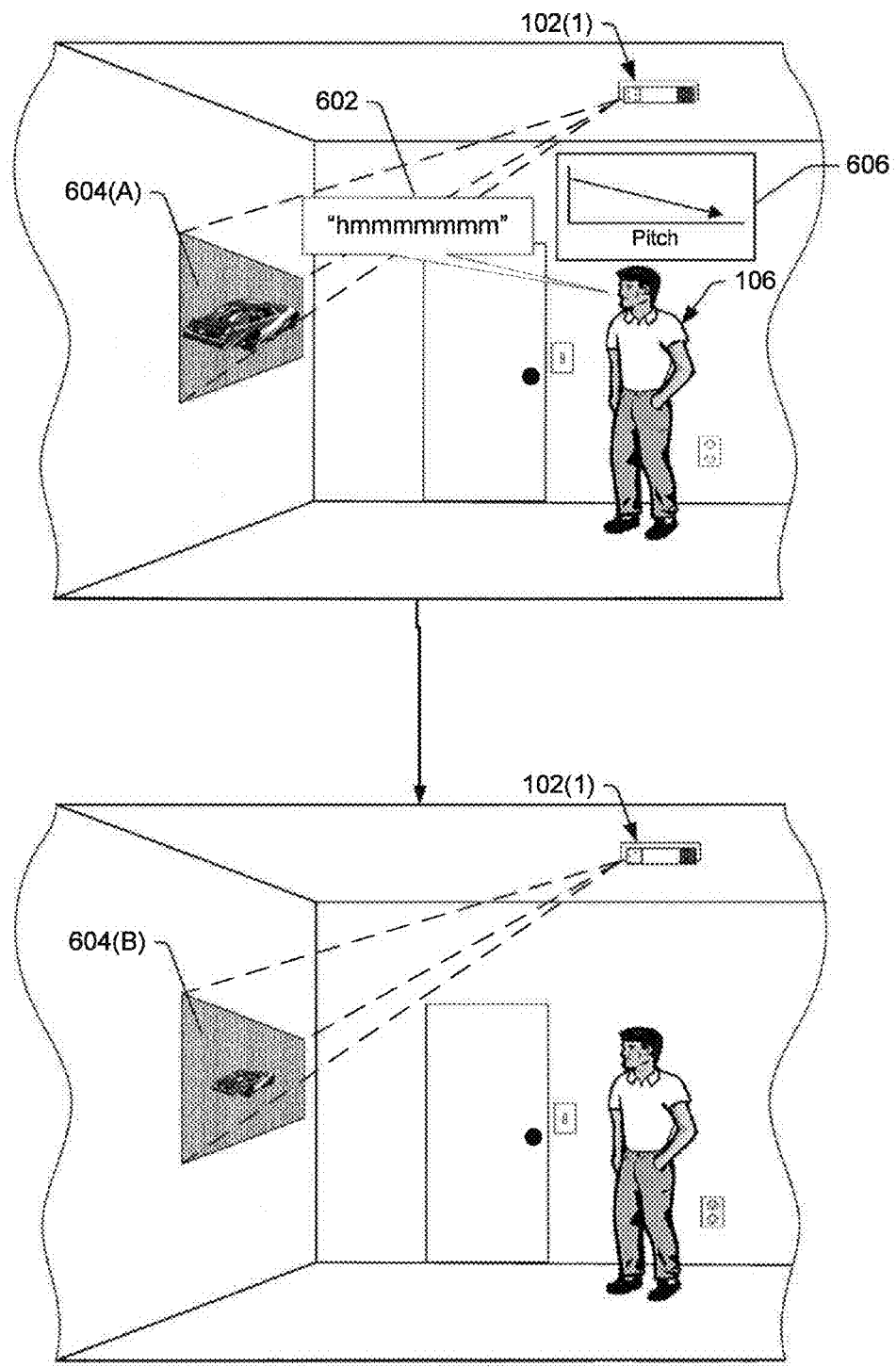
FIG. 6 illustrates a zoom-out voice gesture that is based on a change in pitch of a user's voice.

FIGS. 4-6 illustrate pitch-based voice gestures to zoom in or out on a projected image. FIG. 4 illustrates a zoom voice gesture that is based on the actual pitch of the user's voice, while FIGS. 5 and 6 illustrate zoom voice gestures that are based on changes in pitch of the user's voice.

In the example illustrated in FIG. 4, the user 106 utters a sound 402 while an image of car 404(A) is projected onto a surface within the room. The sound 402 has a particular pitch, indicated by arrow 406. The particular pitch 406 of the sound 402 is below a pitch threshold, indicated by dashed line 408. In the illustrated example, AFRN 102(1) is configured to interpret sounds having a pitch below the pitch threshold as a command to zoom out on the image currently being projected. In response to the interpreted zoom out command, the AFRN 102(1) projects a zoomed out image of the car 404(B). Similarly, if the sound 402 had a pitch above the pitch threshold 408, the AFRN 102(1) may interpret the sound as a command to zoom in on the image currently being projected.

In the example illustrated in FIG. 5, the user 106 utters a sound 502 while an image of car 504(A) is projected onto a surface within the room. The sound 502 increases in pitch over time, as indicated by the arrow in the box 506. In the illustrated example, AFRN 102(1) is configured to interpret sounds that increase in pitch as a command to zoom in on the image currently being projected. In response to the interpreted zoom in command, the AFRN 102(1) projects a zoomed in image of the car 504(B).

Similarly, as illustrated in FIG. 6, if the sound 602 uttered by the user 106 decreases in pitch over time (as shown in box 606), the AFRN 102(1) may interpret the sound as a command to zoom out on the image 604(A) currently being projected, resulting in zoomed out image 604(B).

The examples illustrated in FIGS. 4-6 may alternately be implemented based on volume, such that a particular volume or a change in volume of an utterance from a user may be interpreted as a command to zoom in or out on a projected image.

In alternate implementations, the AFRN may be configured to perform speech recognition to determine a command uttered by a user, and to detect pitch, changes in pitch, volume, or changes in volume to be interpreted as variables associated with the determined command.

Figure 7:
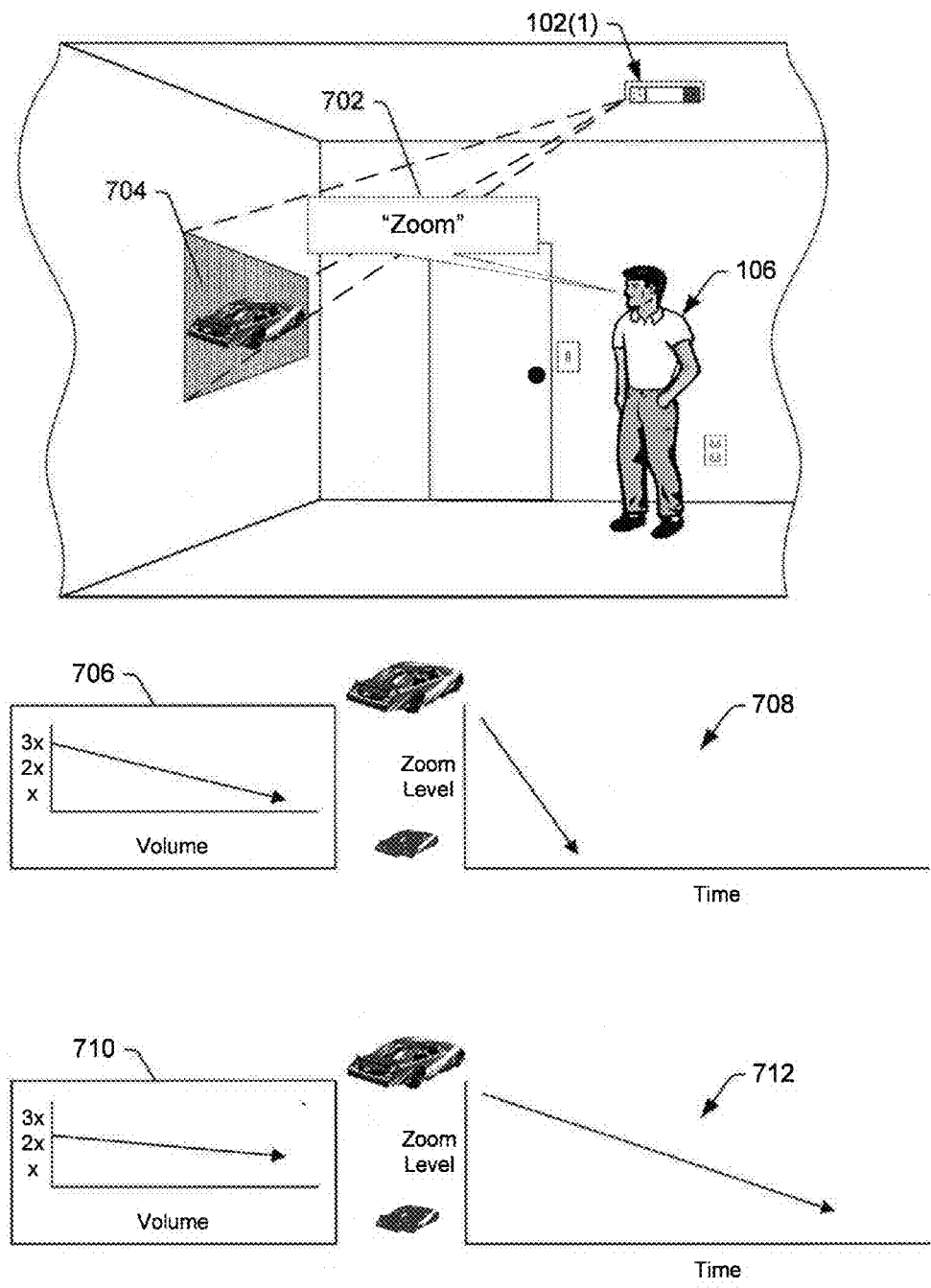
FIG. 7 illustrates an example voice gesture for controlling a zoom rate based on a change in volume.

FIG. 7 illustrates a scenario in which the user 106 speaks a command 702 (e.g., "Zoom") while an image 704 is projected onto a surface of the room. The AFRN 102(1) performs speech recognition to determine the command uttered by the user. The AFRN 102(1) analyzes changes in the volume of the user's voice while the command is spoken to determine how quickly to change the zoom of the image. For example, if the volume of the user's voice changes significantly while the zoom command is spoken, as illustrated in chart 706, then the AFRN 102(1) changes the zoom level of the projected image quickly, as illustrated in chart 708. Similarly, if the volume of the user's voice changes only a small amount while the command is spoken, as illustrated in chart 710 then the AFRN 102(1) changes the zoom level of the projected image slowly, as illustrated in chart 712.

As described above, although illustrated with reference to volume, the example illustrated in FIG. 7 may also be implemented based on changes in pitch. Furthermore, the examples illustrated in FIGS. 4-7 are each described with reference to a "zoom" command. However, in alternate implementations, the AFRN 102(1) may be configured to detect and interpret a wide variety of commands according to the described techniques. For example, alternatively or in addition to a zoom command, the described techniques may be implemented to support commands to scroll, pan, perform navigation within a browser or other application, to control physical attributes within the environment (e.g., open or close blinds, adjust brightness of lighting), and so on.

Figure 8:
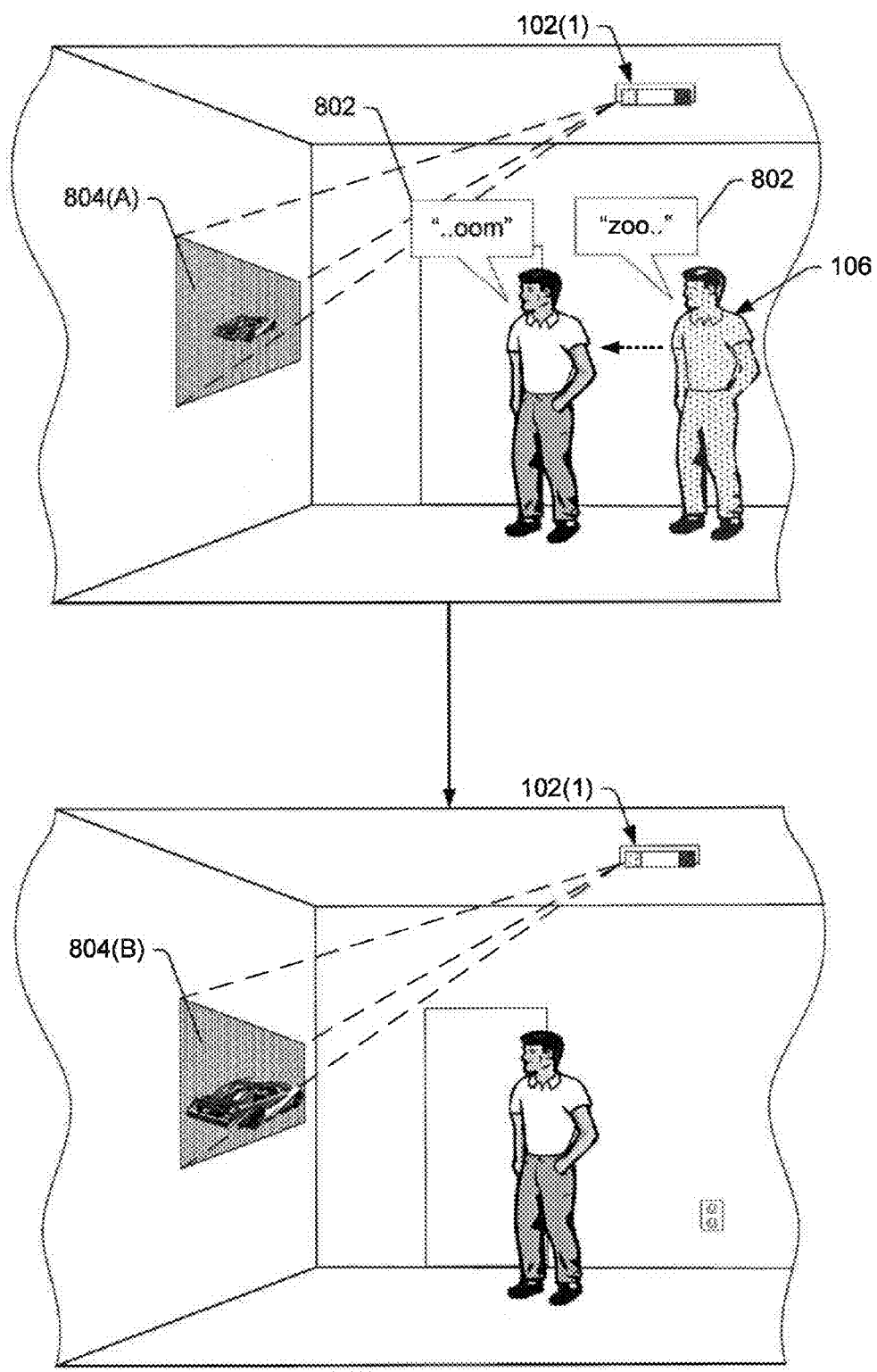
FIG. 8 illustrates an example voice gesture based on a change in user location.
Figure 9:
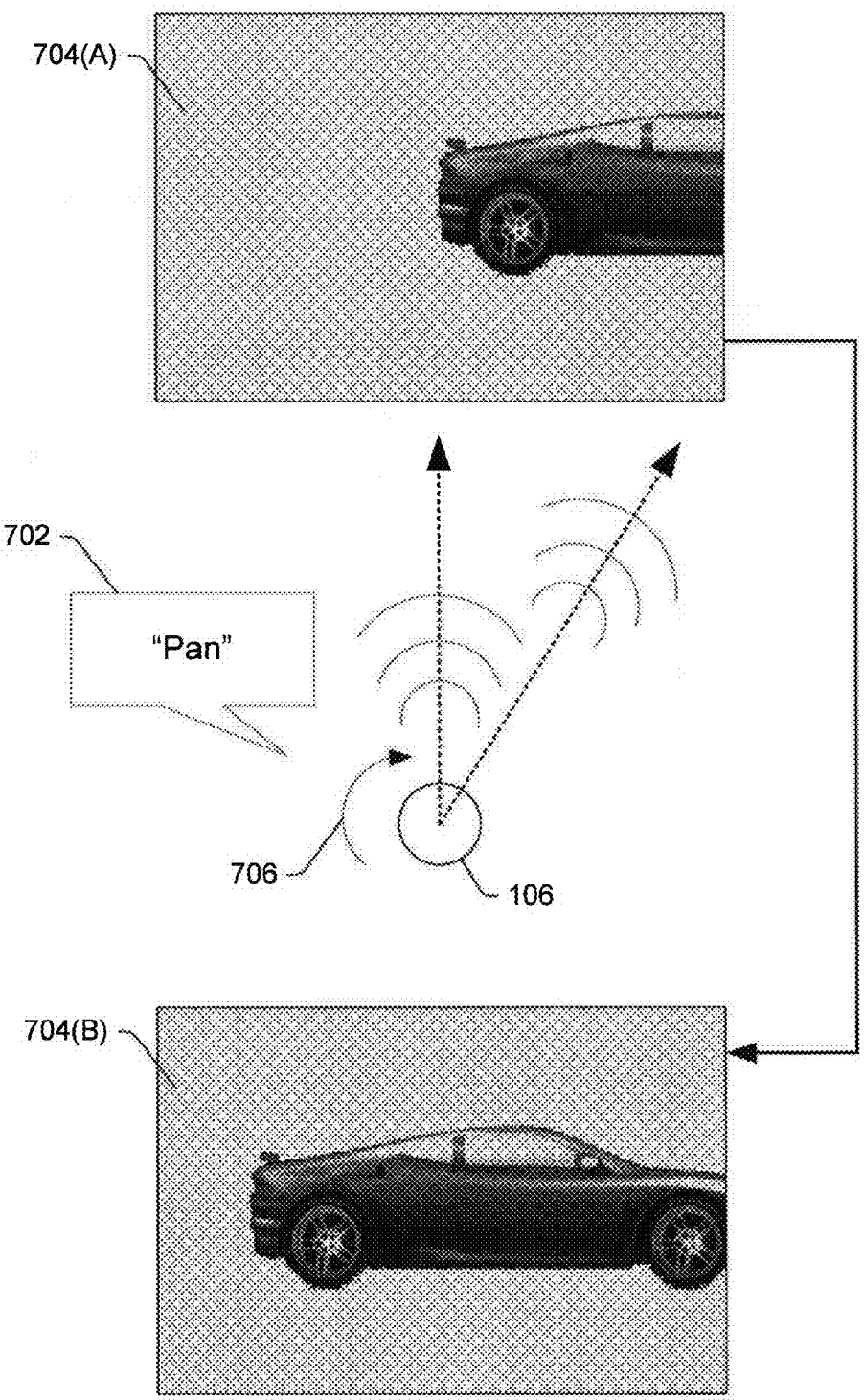
FIG. 9 illustrates an example voice gesture based on a change in audio direction.
Figure 10:
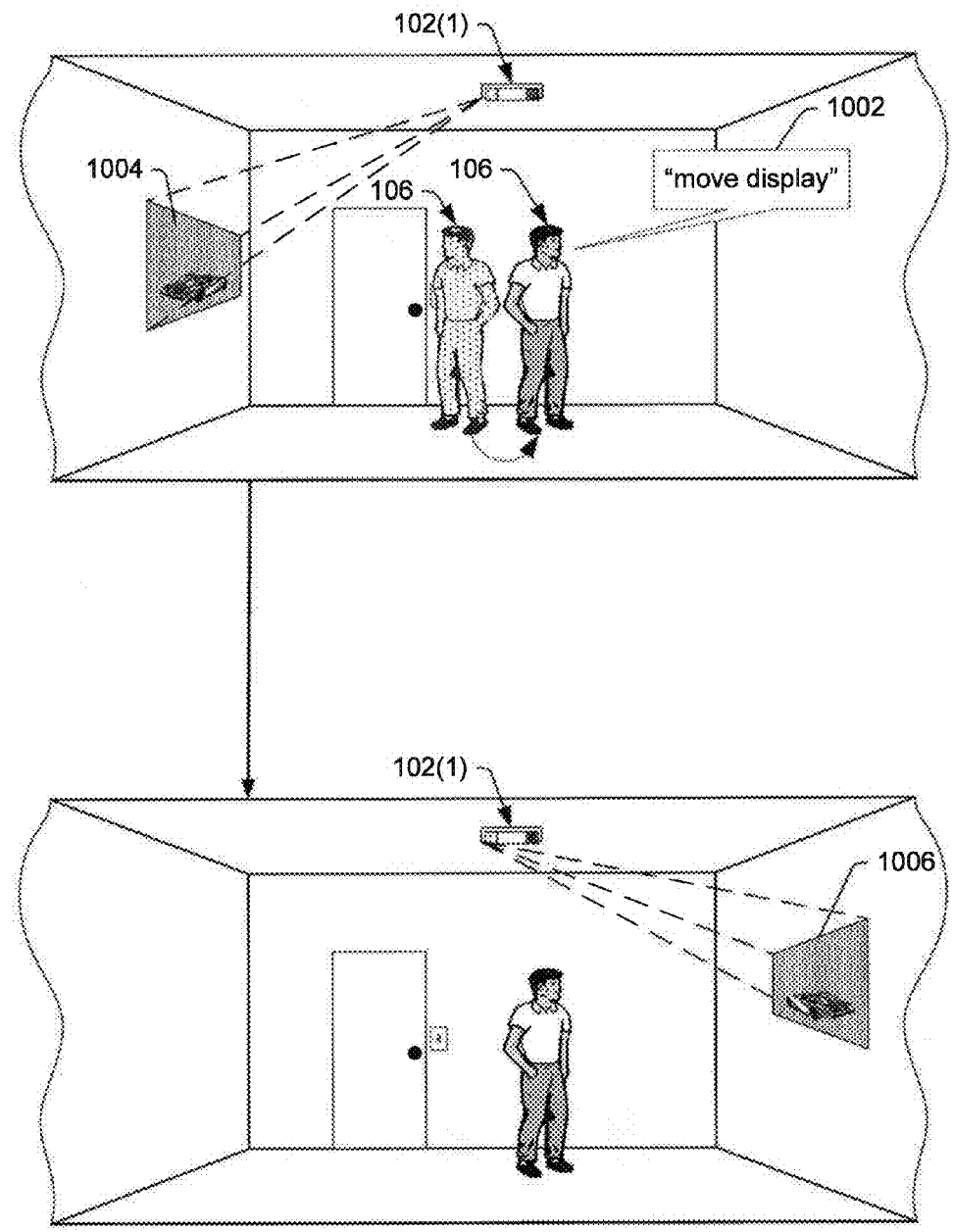
FIG. 10 illustrates another example voice gesture based on a change in audio direction.

In addition to pitch and volume, directionality of sound uttered by a user may also be interpreted as a voice gesture representing either a command or a parameter of a command. FIGS. 8-10 illustrate various examples of location-based and directionality-based voice gestures.

FIG. 8 illustrates a zoom command based at least in part on a change in the user's location while speaking a command. In the illustrated example, the user 106 speaks a command 802, "zoom," while moving toward the surface on which an image 804(A) is being projected. In the illustrated example, the spoken word "zoom" is interpreted (e.g., through speech recognition) as a command, and the change in source location of the sound as the command is spoken is interpreted as a voice gesture to indicate whether to zoom in or to zoom out, and also possibly to indicate how quickly to zoom or how much to zoom. For example, because the user moves toward the projection surface while speaking the command, the command is interpreted as a "zoom in" command, and the AFRN 102(1) projects a zoomed in view of the image 804(B). If the user moves quickly toward the projection surface while speaking the "zoom" command, the zoom may be performed quickly or the image may be zoomed in to a large degree. In contrast, if the user moves slowly toward the projection surface while speaking the "zoom" command, the zoom may be performed slowly or the image may be zoomed in to a smaller degree.

Similarly, in an alternate implementation, the user's location (rather than change in location), relative to the projection surface may be used to determine the command or parameters of a command. For example, if the user is relatively close (e.g., within a threshold distance) when uttering a zoom command, the command may be interpreted as a zoom-out command; if the user is relatively far away when uttering the zoom command, the command may be interpreted as a zoom-in command.

FIG. 9 illustrates a pan command based at least in part on a direction that the user is facing when speaking the command. As used herein, "pan" typically refers to a command to move an image to the left or to the right, while "scroll" typically refers to a similar command to move a document up or down. However, "pan" and "scroll" may be used interchangeably with "pan" typically used in reference to an image, including "panning" the image in any direction, including up or down; and "scroll" typically used in reference to a text document or web page, including "scrolling" the document in any direction, including to the left or to the right. In the illustrated example, the user 106 speaks a "pan" command 702 while looking toward a surface on which an image of a car 704(A) is being displayed. As indicated by the arrow 706, the user rotates their head toward the right while speaking the "pan" command 702. The AFRN interprets the turn of the user's head to the right as an indication that the user wants to view a part of the image 704 that is to the right of the display area. As a result, the AFRN pans the image, resulting in image 704(B). Similar to the examples described above, the degree to which the user's head is turned may be interpreted as a parameter for how much or how fast to pan the image.

While FIG. 9 illustrates a user turning their head to the right, similar parameters for a command may be determined based on the user turning their head to the left or based on the user looking up or down while speaking the command, resulting in a projected image being panned or scrolled to reveal data currently outside of the display area to the left, to the top, or to the bottom, respectively. Various attributes of the directionality of the spoken command may also be interpreted as voice gestures. For example, the location of the user's head can be thought of as a pivot point about which the angle at which a command is spoken may change. The direction in which sound is projected when the user is looking straight toward the surface on which the image is projected can be thought of as an origin direction, and angles may be measured in any direction (e.g., right, left, up, down) from the origin direction as the user speaks.

In an example implementation, a change applied to an image may be controlled by the change in the angle of the user's head while the user is speaking (as measured by the angle of projection of the sound from the user). For example, a slight head turn to the right may result in a slow pan of a projected image, while a head turn with a larger angle to the right may result in a quick pan of the projected image. When the user faces back toward the surface on which the image is projected, the panning may stop. In an alternate implementation, facing back toward the surface on which the image is projected may cause the image to revert to the previous display (i.e., prior to the previous pan command).

Similarly, a rate of change applied to a projected image may be controlled by the rate of change in the angle of the user's head position while the user is speaking. For example, if the user turns their head slowly to the right, the AFRN may pan the image slowly; and if the user turns their head quickly to the right, the AFRN may pan the image quickly.

FIG. 10 illustrates an example voice gesture to change the projection location of a projected image. In the illustrated example, a user 106 speaks a command 1002 while turning from facing a projected image 1004 to facing another surface within the room. Based on the spoken command (e.g., "move display") and the voice gesture (e.g., the direction the user is facing when beginning and ending the spoken command), the AFRN 102(1) stops projecting the image 1004 at the original projection location, and begins projecting the image 1004 at a new projection location 1006.

FIGS. 11-17 show illustrative processes for implementing voice gestures. The processes described herein may be implemented by the architectures described herein, or by other architectures. These processes are illustrated as collections of blocks in logical flow graphs. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented with other architectures as well.

Figure 11:
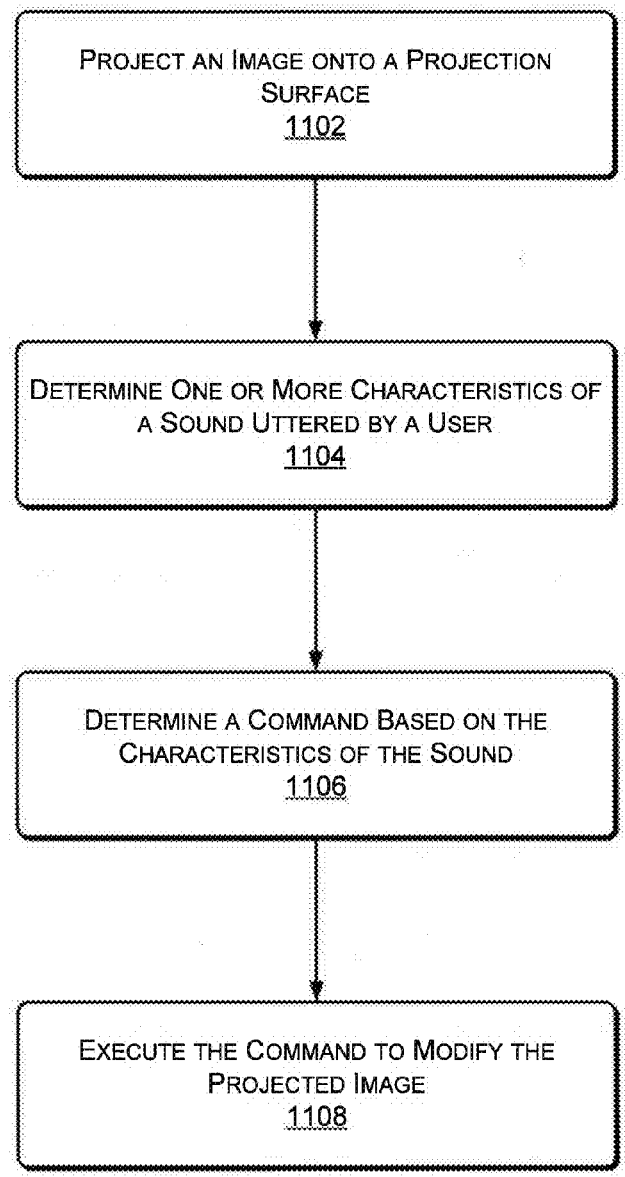
FIG. 11 shows an illustrative process of modifying a projected image based on a received voice gesture.

FIG. 11 shows an illustrative process 1100 of modifying a projected image based on a received voice gesture.

At 1102, an image is projected onto a surface. For example, under the direction of computing device 120, projector 206 projects an image onto a wall within a room.

At 1104, one or more characteristics of a sound uttered by a user are determined. For example, while viewing a projected image, a user within the room utters a sound, which is captured via microphone 218. Audio characteristics module 146 and/or speech recognition module 148 analyze an audio signal based on the captured sound data and determine one or more characteristics. These characteristics may include, but are not limited to, any combination of pitch, volume, origin location, and directionality. Further details regarding characteristics that may be determined are described below with reference to FIG. 12.

At 1106, a command is determined based at least in part on the determined sound characteristics. For example, a command may be determined based on speech recognition processing performed by speech recognition module 148 or a command may be determined based on the determined audio characteristics and a current context, for example, of a projected image. Further details regarding determining a command are described below with reference to FIG. 13.

At 1108, the command is executed to modify the projected image. For example, under control of the processor 122, the projector 206 may project a zooming, scrolling, or panning image. Examples of executing a command are illustrated and described below with reference to FIGS. 14-16.

Figure 12:
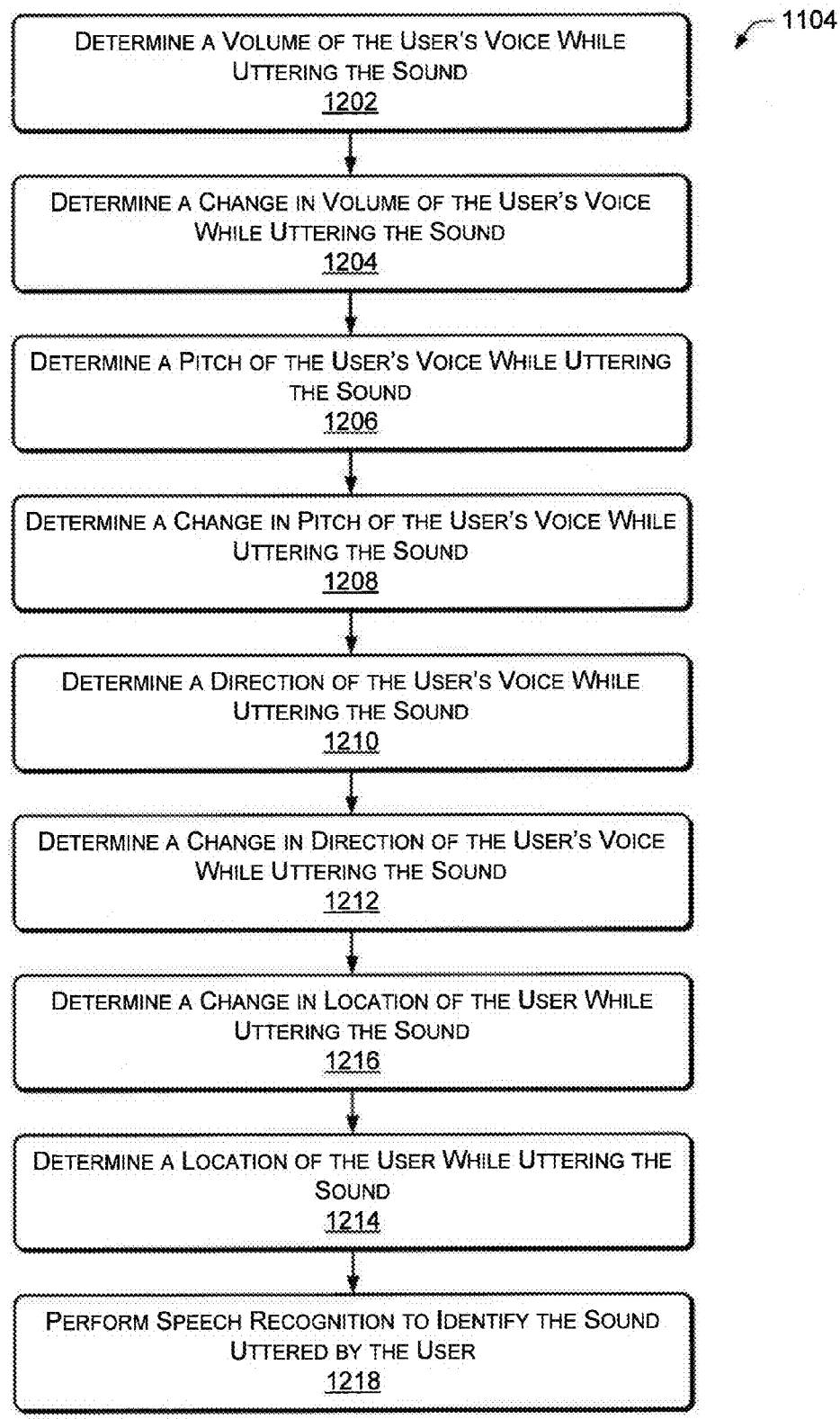
FIG. 12 shows an illustrative process of determining characteristics of sound uttered by a user.

FIG. 12 shows an illustrative process 1104 of determining characteristics of sound uttered by a user. The blocks illustrated in FIG. 12 are distinct examples of characteristics that may be determined. Any one or more of the characteristics illustrated and described with reference to FIG. 12 may be determined in a particular implementation. The inclusion of multiple blocks in FIG. 12 is not intended to imply that each of the represented characteristics will be determined in any particular implementation.

At 1202, a volume of the user's voice while uttering the sound is determined. For example, audio characteristics module 144 may determine a volume level of the user's voice while the user is uttering the sound.

At 1204, a change in volume of the user's voice while uttering the sound is determined. For example, audio characteristics module 144 may determine in what direction and to what degree the volume of the user's voice changes while the user is uttering the sound.

At 1206, a pitch of the user's voice while uttering the sound is determined. For example, audio characteristics module 144 may determine a pitch level of the user's voice while the user is uttering the sound.

At 1208, a change in pitch of the user's voice while uttering the sound is determined. For example, audio characteristics module 144 may determine in what direction and to what degree the pitch of the user's voice changes while the user is uttering the sound.

At 1210, a direction of the user's voice while uttering the sound is determined. For example, audio characteristics module 146, perhaps in conjunction with spatial analysis module 132 and/or tracking and control module 144, determines a location of origin of the sound being uttered by the user and determines a direction that the sound is being projected (e.g., which direction the user is looking while uttering the sound).

At 1212, a change in direction of the user's voice while uttering the sound is determined. For example, audio characteristics module 146, perhaps in conjunction with spatial analysis module 132 and/or tracking and control module 144, determines a location of origin of the sound being uttered by the user and determines changes in direction of the sound is being projected (e.g., which directions the user is looking while uttering the sound).

At 1214, a location of the user while uttering the sound is determined. For example, audio characteristics module 146, perhaps in conjunction with spatial analysis module 132 and/or tracking and control module 144, determines the user's location while the user is uttering the sound. In an example implementation, a command may be applied according to a first set of parameters if the user is at a first location relative to a target of the command (e.g., a projected image), and the command may be applied according to a second set of parameters if the user is at a second location relative to the target of the command.

At 1216, a change in location of the user while uttering the sound is determined. For example, as described above with reference to FIG. 8, if a user moves toward or away from a projection surface while speaking a command, the change in location may be used to determine how to apply the command. Audio characteristics module 146, perhaps in conjunction with spatial analysis module 132 and/or tracking and control module 144, determines changes in the user's location while the user is uttering the sound.

At 1218, speech recognition is performed to identify the sound uttered by the user. For example, speech recognition module 148 performs speech recognition to determine any recognizable voice commands in the sound uttered by the user.

Figure 13:
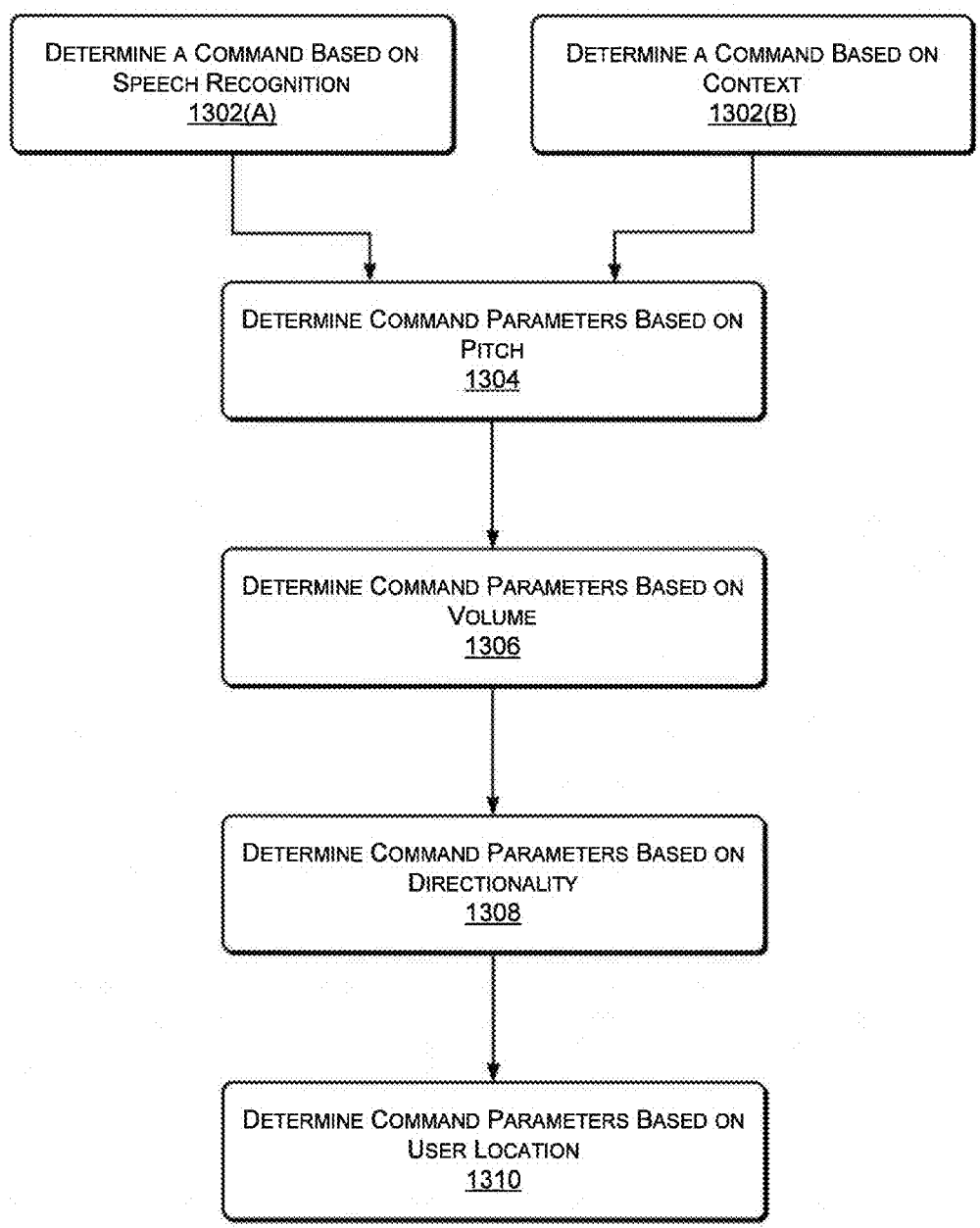
FIG. 13 shows an illustrative process of determining a command in response to receiving a sound uttered by a user.

FIG. 13 shows an illustrative process 1106 of determining a command in response to receiving a sound uttered by a user. The blocks illustrated in FIG. 13 are distinct examples of how commands may be determined. Any one or more of the techniques illustrated and described with reference to FIG. 13 may be utilized in a particular implementation. The inclusion of multiple blocks in FIG. 13 is not intended to imply that each of the represented techniques will be utilized in any particular implementation.

At 1302(A), a command is determined based on speech recognition. For example, speech recognition module 148 performs speed recognition on the received user utterance, and determines an identifiable voice command (e.g., "zoom," "pan," "scroll," and so on).

Alternatively, at 1302(B), a command is determined based on context. For example, if speech recognition module 148 is unable to determine an identifiable voice command, a current context of the ARFN may be used to determine an appropriate command. In an example implementation, if the ARFN is currently projecting an image and the received user utterance exhibits a change in pitch or volume, a zoom command may be determined. Alternatively, if the ARFN is currently projecting an image and the received user utterance exhibits a relatively slight change in directionality, a pan command may be determined. If the ARFN is currently projecting an image and the received utterance exhibits a relatively large change in directionality, a command to change projection location may be determined.

At 1304, command parameters are determined based on pitch. For example, as described above with reference to FIGS. 4-6, a particular pitch level or a determined change in pitch may be used to determine a degree of change (e.g., a degree of zoom or pan) or a rate of change (e.g., how quickly the image will be zoomed or panned).

At 1306, command parameters are determined based on volume. For example, as described above with reference to FIG. 7, a particular volume level or a determined change in volume may be used to determine a degree of change (e.g., a degree of zoom or pan) or a rate of change (e.g., how quickly the image will be zoomed or panned).

At 1308, command parameters are determined based on directionality. For example, as described above with reference to FIGS. 8-10, an angle of projection of the user utterance or a change in angle of projection of the user utterance can be used to determine a degree or rate of change to be applied to a projected image. Further, as described with reference to FIG. 10, a direction of projection may be used to determine a new projection location if a determined command is to move the projection location of the image.

At 1310, command parameters are determined based on user location. For example, as described above with reference to FIG. 8, a particular user location or a determined change in user location may be used to direction of change (e.g., whether to zoom in or zoom out), a degree of change (e.g., a degree of zoom) or a rate of change (e.g., how quickly the image will be zoomed).

Figure 14:
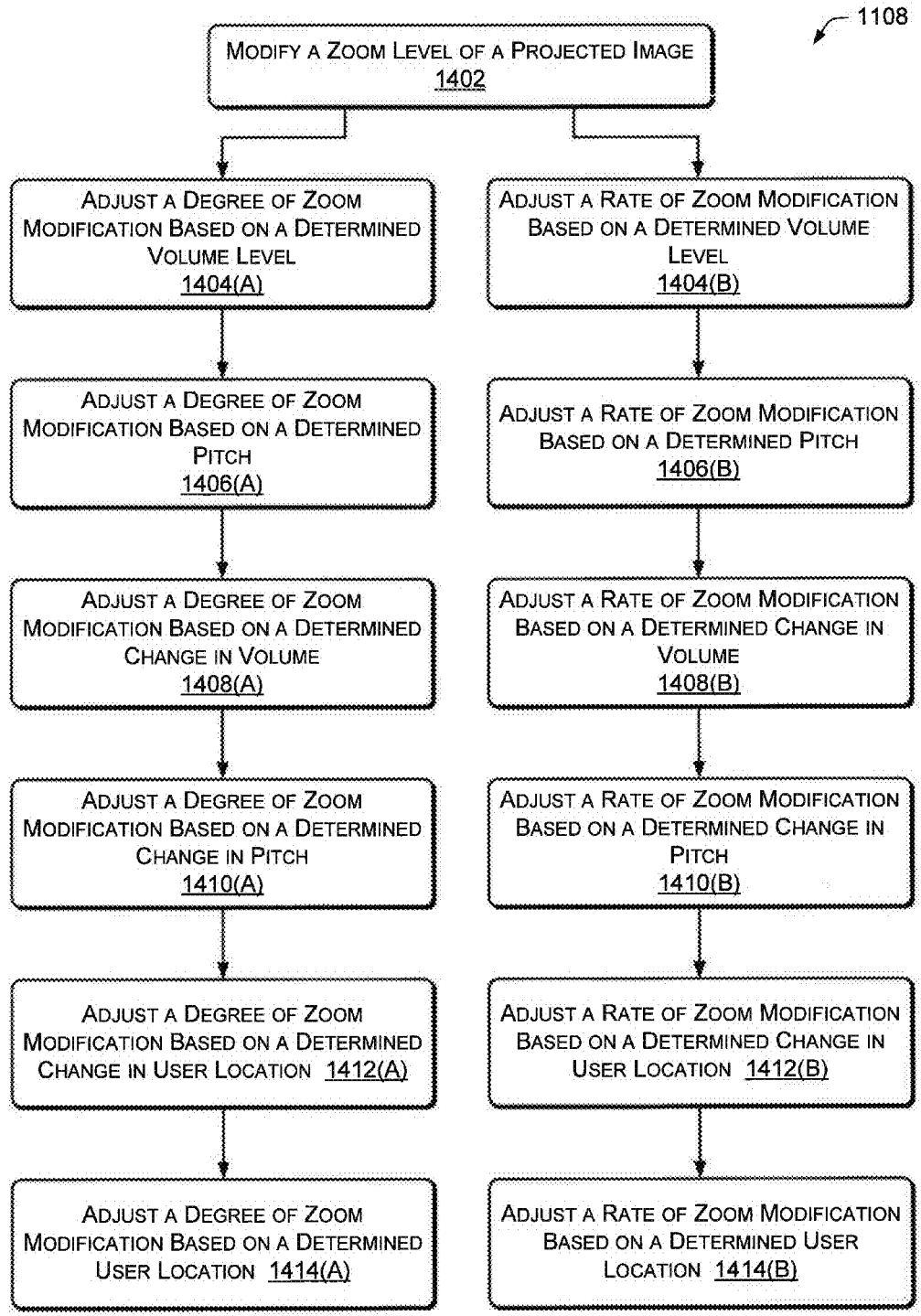
FIG. 14 shows an illustrative process of executing a zoom command in response to receiving a sound uttered by a user.

FIG. 14 shows an illustrative process 1108 of executing a zoom command in response to receiving a sound uttered by a user. The blocks illustrated in FIG. 14 are distinct examples of how a zoom command may be executed in response to a voice gesture. Any one or more of the techniques illustrated and described with reference to FIG. 14 may be utilized in a particular implementation. The inclusion of multiple blocks in FIG. 14 is not intended to imply that each of the represented techniques will be utilized in any particular implementation.

At 1402, a zoom level of a projected image is modified. For example, in response to either speech recognition or context analysis, it was previously determined that a zoom command should be applied to a projected image.

At 1404(A), a degree of zoom modification to be applied is determined based on a determined volume level. For example, similar to the example described above with reference to FIG. 4, a determination may be made regarding whether to zoom in or to zoom out based on whether the volume is above or below a volume threshold. Furthermore, the volume level may also be used to determine how much to change the zoom level (e.g., the more extreme the volume, loud or quiet, the more extreme the change in zoom to be applied to the projected image).

Alternatively, at 1404(B), a rate of zoom modification to be applied is determined based on a determined volume level. In an example implementation, the louder the volume, the more quickly the zoom modification is to be applied.

At 1406(A), a degree of zoom modification to be applied is determined based on a determined pitch. For example, similar to the example described above with reference to FIG. 4, a determination may be made regarding whether to zoom in or to zoom out based on whether the pitch is above or below a pitch threshold. Furthermore, the pitch may also be used to determine how much to change the zoom level (e.g., the more extreme the pitch, high or low, the more extreme the change in zoom to be applied to the projected image).

Alternatively, at 1406(B), a rate of zoom modification to be applied is determined based on a determined pitch. In an example implementation, the higher the pitch, the more quickly the zoom modification is to be applied.

At 1408(A), a degree of zoom modification to be applied is determined based on a determined change in volume. For example, similar to the examples described above with reference to FIGS. 5 and 6, a determination may be made regarding whether to zoom in or to zoom out based on whether the volume increases or decreases. Furthermore, the degree to which the volume changes may also be used to determine how much to change the zoom level (e.g., the more extreme the volume change, the more extreme the change in zoom to be applied to the projected image).

Alternatively, at 1408(B), a rate of zoom modification to be applied is determined based on a determined change in volume. For example, as described with reference to FIG. 7, the more extreme the change in volume, the more quickly the zoom modification is to be applied.

At 1410(A), a degree of zoom modification to be applied is determined based on a determined change in pitch. For example, similar to the examples described above with reference to FIGS. 5 and 6, a determination may be made regarding whether to zoom in or to zoom out based on whether the pitch increases or decreases. Furthermore, the degree to which the pitch changes may also be used to determine how much to change the zoom level (e.g., the more extreme the pitch change, the more extreme the change in zoom to be applied to the projected image).

Alternatively, at 1410(B), a rate of zoom modification to be applied is determined based on a determined change in pitch. For instance, similar to the example described with reference to FIG. 7, the more extreme the change in pitch, the more quickly the zoom modification is to be applied.

At 1412(A), a degree of zoom modification to be applied is determined based on a determined change in user location. For example, as described above with reference to FIG. 8, a determination may be made regarding whether to zoom in or to zoom out based on a direction of change in user location (e.g., if the user moves further away, zoom out; if the user moves closer to the projection surface, zoom in). Furthermore, the degree to which the user location changes may also be used to determine how much to change the zoom level (e.g., the further the distance that the user moves, the more extreme the change in zoom to be applied to the projected image).

Alternatively, at 1412(B), a rate of zoom modification to be applied is determined based on a determined change in user location. For instance, similar to the example described with reference to FIG. 7, the further the user moves or the more quickly the user moves, the more quickly the zoom modification is to be applied.

At 1414(A), a degree of zoom modification to be applied is determined based on a determined user location. For example, as described above with reference to FIG. 8, a determination may be made regarding whether to zoom in or to zoom out based on a user location relative to the projection surface (e.g., if the user is close, zoom out; if the user is further away, zoom in). Furthermore, the relative location of the user with reference to the projection surface may also be used to determine how much to change the zoom level (e.g., the closer the user is, the more the image is zoomed out; the further away the user is, the more the image is zoomed in).

Alternatively, at 1414(B), a rate of zoom modification to be applied is determined based on a determined user location. For instance, the greater the distance between the user and the projection surface, the more quickly a zoom-in modification is to be applied.

Figure 15:
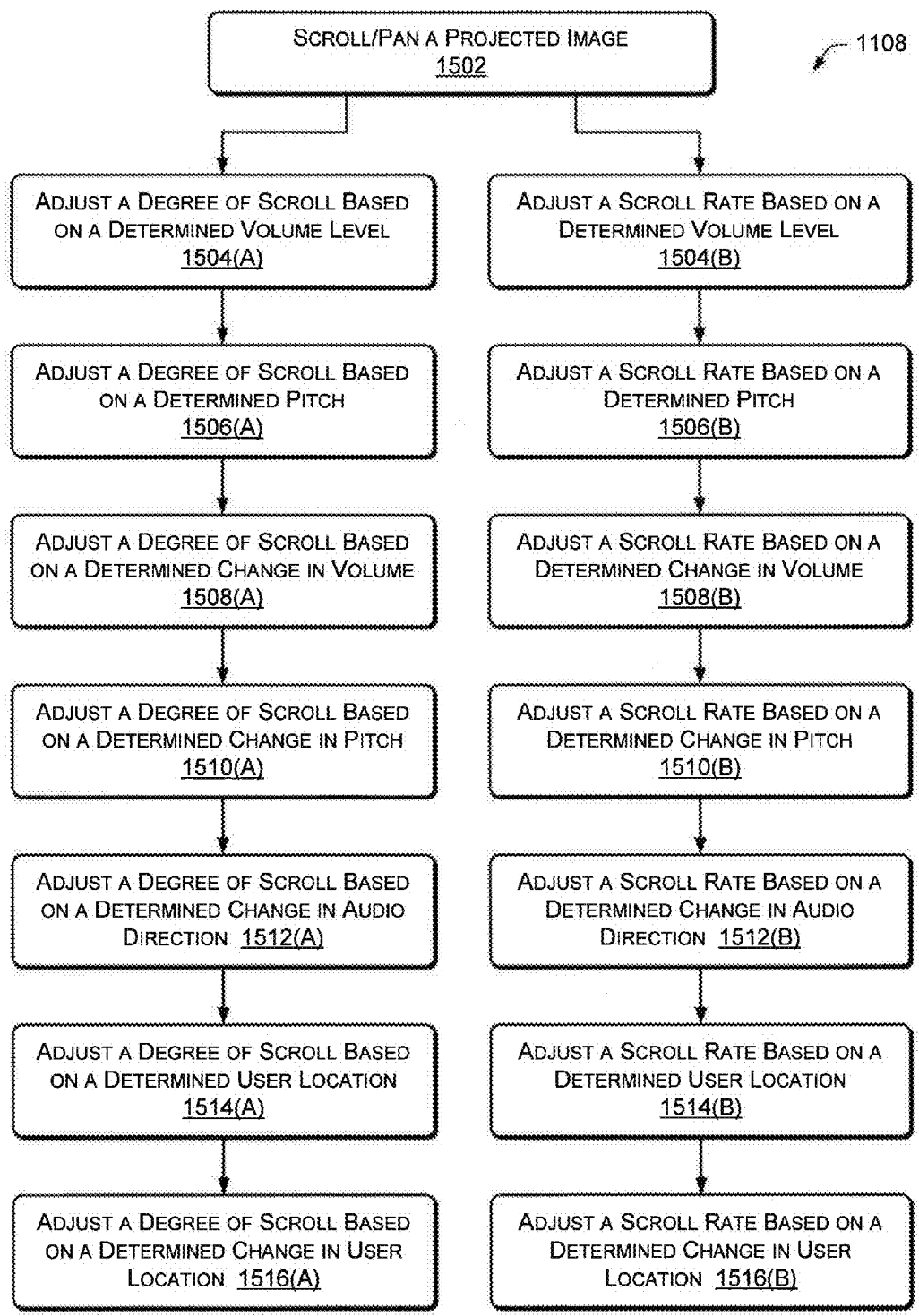
FIG. 15 shows an illustrative process of executing a scroll or pan command in response to receiving a sound uttered by a user.

FIG. 15 shows an illustrative process 1108 of executing a scroll or pan command in response to receiving a sound uttered by a user. The blocks illustrated in FIG. 15 are distinct examples of how a scroll/pan command may be executed in response to a voice gesture. Any one or more of the techniques illustrated and described with reference to FIG. 15 may be utilized in a particular implementation. The inclusion of multiple blocks in FIG. 15 is not intended to imply that each of the represented techniques will be utilized in any particular implementation.

At 1502, a scroll or pan position of a projected image is modified. For example, in response to either speech recognition or context analysis, it was previously determined that a scroll/pan command should be applied to a projected image.

At 1504(A), a degree of scroll to be applied is determined based on a determined volume level. For example, similar to the example described above with reference to FIG. 4, a determination may be made regarding whether to scroll up, scroll down, pan right, or pan left based on whether the volume is above or below a volume threshold. Furthermore, the volume level may also be used to determine how much to scroll/pan the image (e.g., the more extreme the volume, loud or quiet, the more extreme the scroll/pan to be applied to the projected image).

Alternatively, at 1504(B), a scroll rate to be applied is determined based on a determined volume level. In an example implementation, the louder the volume, the more quickly the scroll/pan is to be applied.

At 1506(A), a degree of scroll/pan to be applied is determined based on a determined pitch. For example, similar to the example described above with reference to FIG. 4, a determination may be made regarding whether to scroll up, scroll down, pan left, or pan right based on whether the pitch is above or below a pitch threshold. Furthermore, the pitch may also be used to determine how much to scroll/pan the projected image (e.g., the more extreme the pitch, high or low, the more extreme the scroll/pan to be applied to the projected image).

Alternatively, at 1506(B), a scroll rate to be applied is determined based on a determined pitch. In an example implementation, the higher the pitch, the more quickly the projected image is to be scrolled/panned.

At 1508(A), a degree of scroll to be applied is determined based on a determined change in volume. For example, similar to the examples described above with reference to FIGS. 5 and 6, a determination may be made regarding whether to scroll up, scroll down, pan left, or pan right based on whether the volume increases or decreases. Furthermore, the degree to which the volume changes may also be used to determine how much to scroll/pan (e.g., the more extreme the volume change, the more extreme the scroll/pan to be applied to the projected image).

Alternatively, at 1508(B), a scroll rate to be applied is determined based on a determined change in volume. For example, as described with reference to FIG. 7, the more extreme the change in volume, the more quickly the scroll/pan is to be applied.

At 1510(A), a degree of scroll to be applied is determined based on a determined change in pitch. For example, similar to the examples described above with reference to FIGS. 5 and 6, a determination may be made regarding whether to scroll up, scroll down, pan left, or pan right based on whether the pitch increases or decreases. Furthermore, the degree to which the pitch changes may also be used to determine how much to scroll/pan the projected image (e.g., the more extreme the pitch change, the more extreme the scroll/pan to be applied to the projected image).

Alternatively, at 1510(B), a scroll rate to be applied is determined based on a determined change in pitch. For instance, similar to the example described with reference to FIG. 7, the more extreme the change in pitch, the more quickly the scroll/pan is to be applied.

At 1512(A), a degree of scroll/pan to be applied is determined based on a determined change in audio direction. For example, as described above with reference to FIG. 9, a determination may be made regarding whether to scroll up, scroll down, pan right, or pan left based on a change in direction of the audio projection from the user (e.g., if the user turns their head to the right while uttering the sound, pan left to display more of the right side of the image). Furthermore, the degree to which the audio direction changes may also be used to determine how much to scroll/pan (e.g., the greater the angle of projection from an origin point, the more extreme the scroll/pan to be applied to the projected image).

Alternatively, at 1512(B), a scroll rate to be applied is determined based on a determined change in audio direction. For example, the further the audio projection from an origin or the more quickly the audio direction changes, the more quickly the scroll/pan is to be applied.

At 1514(A), a degree of scroll to be applied is determined based on a determined user location. For example, similar to the description above with reference to FIG. 8, a determination may be made regarding whether to scroll up, scroll down, pan right, or pan left based on a user location relative to the projection surface (e.g., if the user is to the right of the center of the projection surface, pan right; if the user is to the left of the center of the projection surface, pan left; if the user is standing, scroll up; if the user is sitting, scroll down). Furthermore, the relative location of the user with reference to the projection surface may also be used to determine how much to scroll/pan the image (e.g., the greater the distance between the user and the center of the projection surface, the more the image is panned left or right).

Alternatively, at 1514(B), a scroll rate to be applied is determined based on a determined user location. For instance, the greater the distance between the user and the center of the projection surface, the more quickly the scroll/pan is to be applied.

At 1516(A), a degree of scroll/pan to be applied is determined based on a determined change in user location. For example, as described above with reference to FIG. 8, a determination may be made regarding whether to scroll up, scroll down, pan right, or pan left based on a change in location of the user (e.g., if the user moves to the right while uttering the sound, pan left to display more of the right side of the image). Furthermore, the degree to which the user location changes may also be used to determine how much to scroll/pan (e.g., the further the user moves or the faster the user moves, the more extreme the scroll/pan to be applied to the projected image).

Alternatively, at 1516(B), a scroll rate to be applied is determined based on a determined change in user location. For example, the further the user moves or the faster the user moves, the more quickly the scroll/pan is to be applied.

Figure 16:
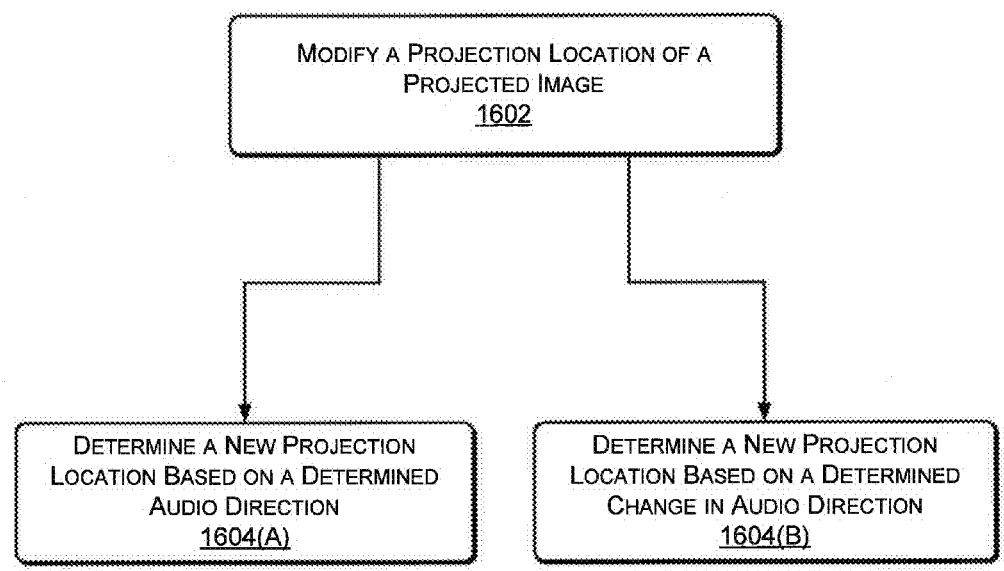
FIG. 16 shows an illustrative process of executing a command to modify a projection location of a projected image in response to receiving a sound uttered by a user.

FIG. 16 shows an illustrative process 1108 of executing a command to modify a projection location of a projected image in response to receiving a sound uttered by a user. The blocks illustrated in FIG. 16 are distinct examples of how a command to modify a projection location may be executed in response to a voice gesture. Any one or more of the techniques illustrated and described with reference to FIG. 16 may be utilized in a particular implementation. The inclusion of multiple blocks in FIG. 16 is not intended to imply that each of the represented techniques will be utilized in any particular implementation.

At 1602, a projection location of a projected image is modified. For example, in response to either speech recognition or context analysis, it was previously determined that projection location of a projected image should be changed.

At 1604(A), a new projection location is determined based on a determined audio direction. For example, when the user utters the sound, if the user is facing a potential projection surface, different from the surface on which the image is currently being projected, the potential projection surface may be determined as the new projection location.

Alternatively, at 1604(B), a new projection location is determined based on a determined change in audio direction. For example, as described above with reference to FIG. 10, if the user turns from the current projection surface to face another potential projection surface while uttering the sound, the voice gesture may be interpreted as a command to move the image from the current projection surface to the potential projection surface.

Figure 17:
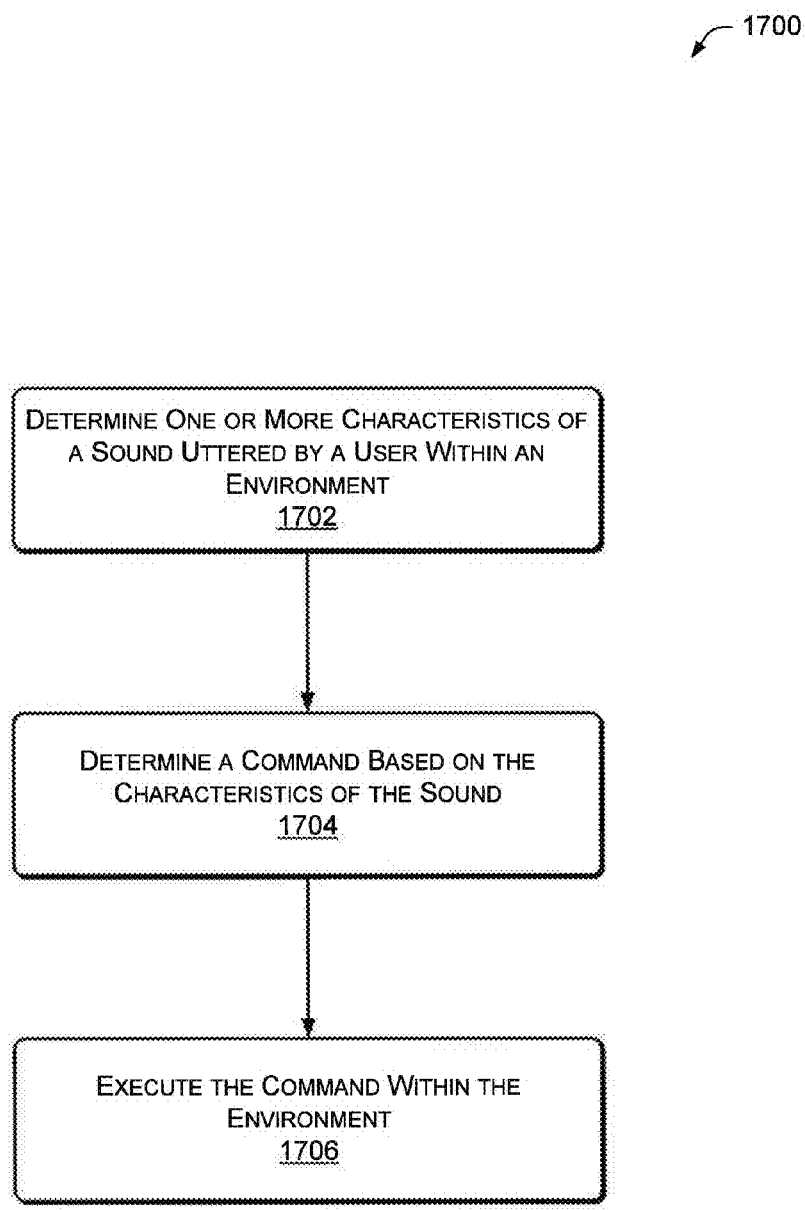
FIG. 17 shows an example process for receiving a voice gesture and executing a command within an environment in response to the voice gesture.

FIGS. 11-16 illustrate example processes for receiving a voice gesture and modifying a projected image in response to the voice gesture. FIG. 17 shows an example process 1700 for receiving a voice gesture and executing a command within an environment in respond to the voice gesture. The command executed within the environment need not be limited to a projected image, and may be used to alter the environment in any number of ways.

At 1702, one or more characteristics of a sound uttered by a user within an environment are determined. For example, as has been described above, characteristics of an uttered sound may include, but are not limited to, volume, pitch, origin location, and directionality, including physical movement of the user while uttering the sound or changes in direction of the sound being uttered by the user.

At 1704, a command is determined based at least in part on the characteristics of the sound. In an example implementation, speech recognition may be used to determine a command recognizable within an audio signal based on the sound uttered by the user. In an alternate implementation, a context within the environment may be used in combination with the characteristics of the sound to determine the command. For example, if an image is being projected within the environment, and the sound is uttered in the general direction of the projection surface, a command to modify the projected image may be determined. If the projected image is an application (e.g., a web browser, an book reader application, an audio book application, a video recording application, a geographical navigation application, and so on) the command may be a command to interact with the application (e.g., to move to a next browser tab, to turn the page of a book, to change the volume of an audio book, to control the direction a camera is facing via a video recording application, move to a next step in a set of navigation directions, and so on). As another example, if the sound is uttered in the general direction of a physical window, a command to open or close the window blinds may be determined. In yet another example, if the sound is uttered in the general direction of a light fixture, a command to turn the light on or off or a command to modify a brightness of the light may be determined.

Furthermore, as described above, determining a command may also include determining parameters of the command. For example, a zoom command may be determined based on voice recognition, while a direction to zoom may be determined based on a volume, and a zoom rate may be determined based on a change in pitch. Any combination of characteristics may be used to determine either the command or the parameters of the command.

At 1706, the determined command is executed within the environment. As described above, executing the command may result in a modification to a projected image or may result in a modification of physical attributes (e.g., lighting levels, blinds open or closed, etc) within the environment. In an example environment, rather than altering a projected image, the determined command may be executed to control a video camera that is recording a video stream. Alternatively, the techniques described herein may be implemented within a hands-free environment, such as within a vehicle. For example, within an automobile, the techniques described herein may be used to provide user interaction with a map navigation application, an in-car audio system, a communication system (e.g., a mobile phone), and so on.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims

What is claimed is:

1. A method comprising: under control of one or more processors configured with executable instructions, displaying:
   an image on a surface;
   determining a characteristic of a sound uttered by a user, wherein the characteristic includes at least a direction the user is facing when uttering the sound;
   ceasing to display the image on the surface; and
   displaying the image on a different surface.

2. A method as recited in claim 1, wherein the image comprises a user interface associated with an application.

3. A method as recited in claim 1, wherein displaying the image comprises projecting the image onto the surface.

4. A method as recited in claim 1, wherein the sound uttered by the user further comprises a recognizable voice command.

5. A method as recited in claim 1, further comprising:
   performing speech recognition on an audio signal generated from the sound uttered by the user to determine a command; and
   determining a parameter to control execution of the command based at least in part on the determined characteristic of the sound uttered by the user, the characteristic further includes one of a volume, a pitch, or a location of the user when uttering the sound; and
   modifying the image that is displayed by performing an action associated with the determined command and performing the action in accordance with the determined parameter.

6. A method as recited in claim 1, wherein displaying the image on the different surface further comprises at least one of:
- adjusting a zoom of the image;
- panning the image; or
- scrolling the image.

7. A system comprising:
- one or more microphones for receiving sound from within an environment and for generating corresponding audio signals;
- one or more processors; and
- computer-readable media storing computer-executable instructions that, when executed by the one or more processors, cause the one or more processors to perform acts comprising:
  - determining, based on the generated audio signals, at least one of a decrease or an increase in a volume level of the sound, wherein the increase in the volume level is associated with a first action and the decrease in the volume level is associated with a second action that is opposite the first action; and
  - performing the first action or the second action within the environment based at least in part on the determined decrease or increase in the volume level of the sound.

8. A system as recited in claim 7, the acts further comprising determining an execution parameter based at least in part on the determined decrease or increase in the volume level of the sound such that the execution parameter describes how the command is to be executed.

9. A system as recited in claim 8, wherein the execution parameter describes at least one of a degree to which the first action or the second action is to be performed or a rate at which the first action or the second action is to be performed.

10. A system as recited in claim 7, further comprising a projector for projecting an image within the environment, and wherein the first action or the second action alters the projected image.

11. A system as recited in claim 8, further comprising a camera for recording an image within the environment, and wherein the first action or the second action comprises modifying a position of the camera.

12. A system as recited in claim 7, wherein the environment is a hands-free environment.

13. A system as recited in claim 12, wherein the hands-free environment is within an automobile.

14. A system comprising:
- one or more processors; and
- computer-readable media storing computer-executable instructions that, when executed by the one or more processors, cause the one or more processors to perform acts comprising:
  - causing display of an image on a surface;
  - determining a characteristic of a sound uttered by a user, wherein the characteristic includes at least a direction the user is facing when uttering the sound;
  - ceasing display of the image on the surface; and
  - causing display of the image on a different surface.

15. A system as recited in claim 14, wherein the image comprises a user interface associated with an application.

16. A system as recited in claim 14, wherein the sound uttered by the user further comprises a recognizable voice command.

17. A system as recited in claim 14, the acts further comprising:
- performing speech recognition on an audio signal generated from the sound uttered by the user to determine a command; and
- determining a parameter to control execution of the command based at least in part on the determined characteristic of the sound uttered by the user, the characteristic further includes one of a volume, a pitch, or a location of the user when uttering the sound; and
- modifying display of the image by performing an action associated with the determined command and performing the action in accordance with the determined parameter.

18. A system as recited in claim 17, wherein the command comprises at least one of a zoom command, a pan command, or a scroll command.

19. A system as recited in claim 14 wherein causing display of the image on the different surface further comprises at least one of:
- adjusting a zoom of the image;
- panning the image; or
- scrolling the image.

20. A system as recited in claim 14, wherein the direction the user is facing when uttering the sound undergoes a change to a different direction while the user utters the sound.

* * * * *